(12) United States Patent
Shim et al.

(10) Patent No.: US 8,130,676 B2
(45) Date of Patent: Mar. 6, 2012

(54) METHOD FOR ON DEMAND DISTRIBUTED HASH TABLE UPDATE

(75) Inventors: Eunsoo Shim, Princeton Junction, NJ (US); Sathya Narayanan, Marina, CA (US)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/942,400

(22) Filed: Nov. 9, 2010

(65) Prior Publication Data

US 2011/0060843 A1 Mar. 10, 2011

Related U.S. Application Data

(63) Continuation of application No. 11/395,820, filed on Mar. 31, 2006, now Pat. No. 7,881,223.

(51) Int. Cl.
*H04L 12/28* (2006.01)
(52) U.S. Cl. ........................................ 370/254; 370/401
(58) Field of Classification Search .................. None
See application file for complete search history.

(56) References Cited

U.S. PATENT DOCUMENTS

2003/0204509 A1  10/2003  Dinker et al.
(Continued)

OTHER PUBLICATIONS

S. Rhea et al., Handling Churn in a DHT, Report No. UCB/CSD-03-1299, Dec. 2003, pp. 1-15; Computer Science Division (EECS), University of California, Berkeley, CA 94720.

(Continued)

*Primary Examiner* — Chirag Shah
*Assistant Examiner* — Minh-Trang Nguyen
(74) *Attorney, Agent, or Firm* — RatnerPrestia

(57) ABSTRACT

A method for managing communication in a peer-to-peer network in which overlay information is updated on-demand such that neighboring node information is updated at least periodically and other overlay information is updated on-demand (from standard communications). For example, in one aspect, the network includes a plurality of nodes, and the method includes sending a leaving message from a leaving node to the predecessor and successor nodes of the leaving node, the leaving message including information relating to the leaving node, updating each of the predecessor and successor nodes exclusive of any other nodes of the plurality of nodes.

7 Claims, 21 Drawing Sheets

U.S. PATENT DOCUMENTS

| | | |
|---|---|---|
| 2003/0204742 A1 | 10/2003 | Gupta et al. |
| 2004/0044727 A1 | 3/2004 | Abdelaziz et al. |
| 2004/0054807 A1 | 3/2004 | Harvey et al. |
| 2004/0064568 A1 | 4/2004 | Arora et al. |
| 2004/0148333 A1 | 7/2004 | Mansion et al. |
| 2004/0210624 A1 | 10/2004 | Andrzejak et al. |
| 2004/0249972 A1 | 12/2004 | White et al. |
| 2005/0157659 A1 | 7/2005 | Huitema |
| 2005/0276216 A1* | 12/2005 | Vasseur et al. ............ 370/400 |
| 2006/0087990 A1 | 4/2006 | Kakivaya et al. |
| 2006/0088039 A1 | 4/2006 | Kakivaya et al. |
| 2006/0245351 A1 | 11/2006 | Pande et al. |
| 2007/0079004 A1 | 4/2007 | Tatemura et al. |

OTHER PUBLICATIONS

R. Mahajan, M. Castro, and A. Rowstron. *Controlling the cost of reliability in peer-to-peer overlays*. In Proc. IPTPS, pp. 1-6; Feb. 2003.

A. Ghodsi et al., Low-Bandwidth Topology Maintenance for Robustness in Structured Overlay Networks; pp. 1-10, 2005.

I. Stoica et al., Chord: A Scalable Peer-to-peer Lookup Service for Internet Applications; pp. 1-12;Sigcomm'01, Aug. 27-31, 2001.

Alima, L.O.,El-Ansary, S., Brand, P., Haridi, S.: DKS(N, k, f ): A Family of Low Communication, Scalable and Fault-Tolerant Infrastructures for P2P Applications, In the 3rd Int workshop CCGRID2003, Tokyo, Japan, (2003).

* cited by examiner

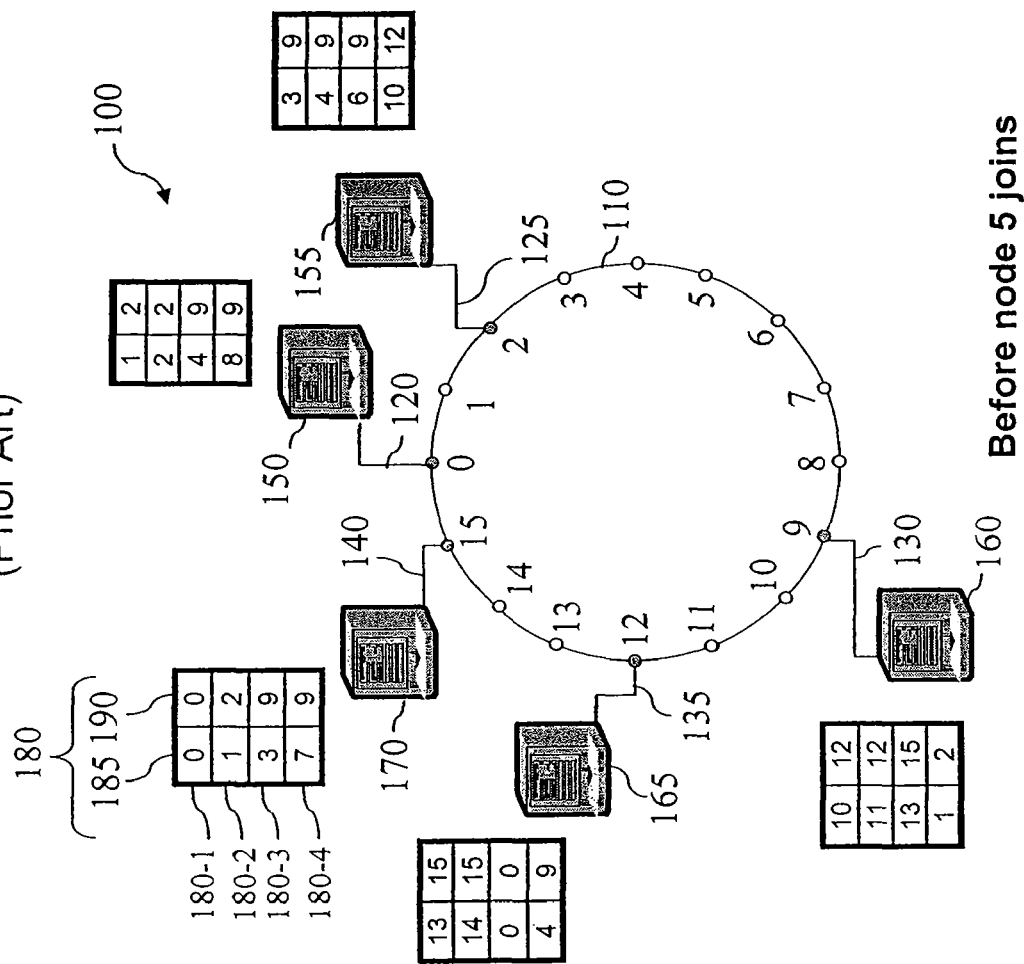

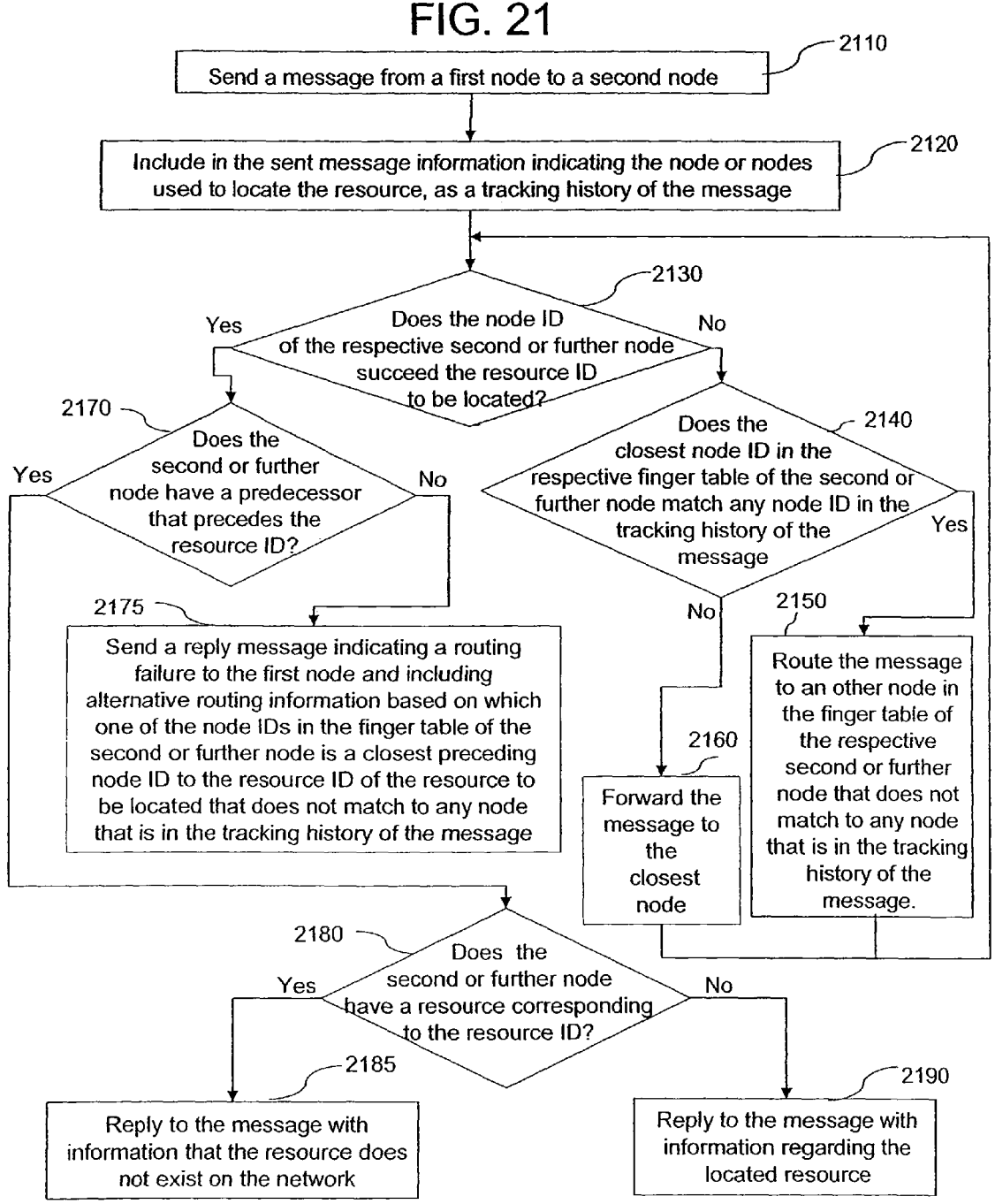

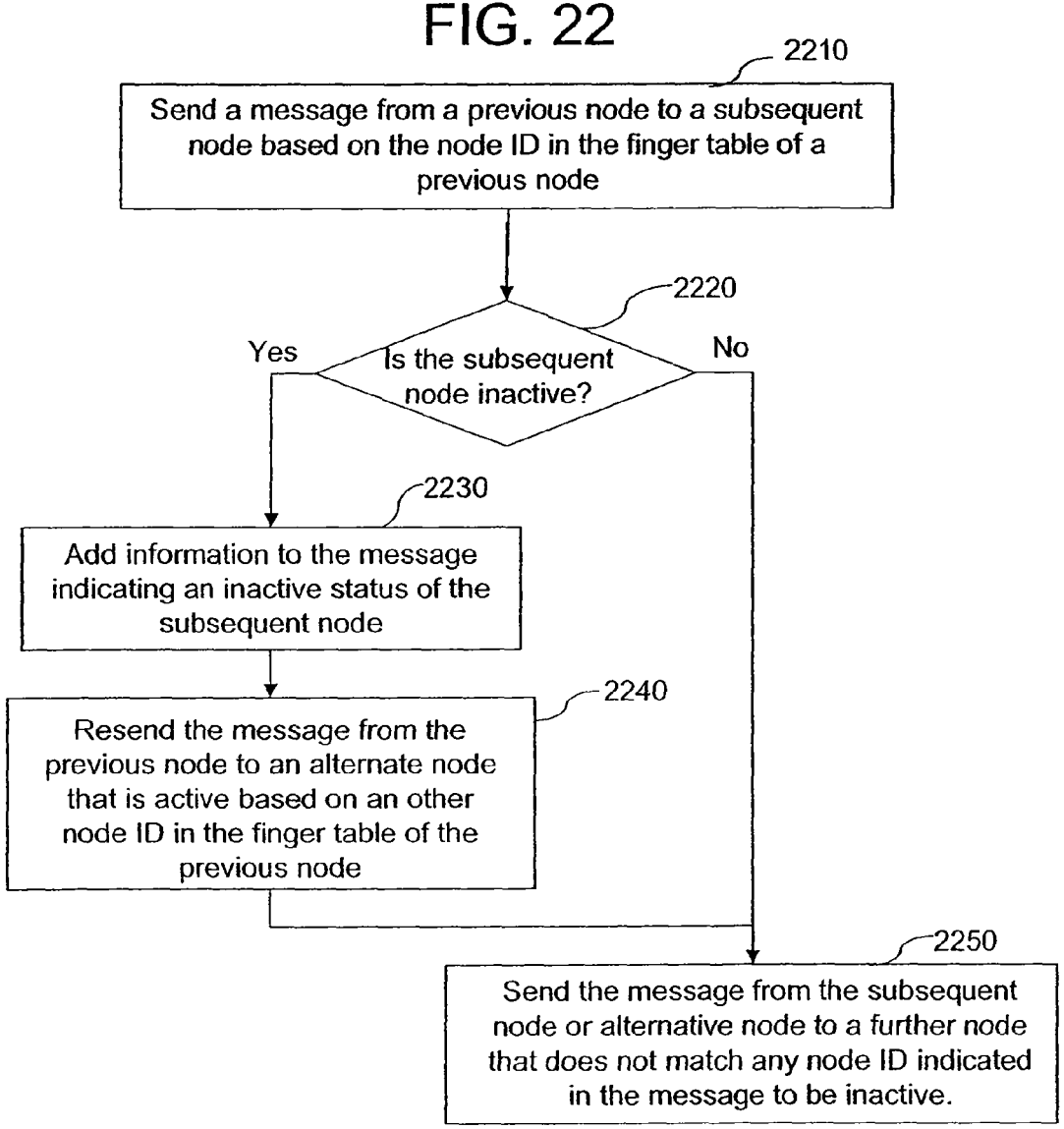

METHOD FOR ON DEMAND DISTRIBUTED HASH TABLE UPDATE

This application is a continuation of U.S. application Ser. No. 11/395,820, filed Mar. 31, 2006 (pending), the entire contents of which are hereby incorporated herein by reference.

FIELD OF THE INVENTION

The present invention relates to the field of distributed networks generally and, in particular, a method for on-demand updating of a distributed hash table in a peer-to-peer network.

BACKGROUND OF THE INVENTION

Peer-to-peer (P2P) networks have become increasingly popular with their primary application being file-sharing. Others are using P2P networks for communication, such as Skype®, which has implemented a voice over Internet protocol (VoIP) P2P telephone service.

Distributed hash tables (DHTs) are used in certain P2P networks to improve the efficiency of locating resources on these networks. In these P2P networks, a hash key (resource ID) is associated with a resource (e.g., a file) and each node in the system is responsible for storing a certain range of hash keys of a hash space. A lookup operation looking for a particular key is routed through the P2P network to the node responsible for the key using a specific routing algorithm. Node identifiers (node ID s) are assigned to each node in the P2P network and are mapped to the same hash space as the resource IDs. That is, each node is responsible for storing all resources that have a certain range of resource IDs. Typically, in a DHT resources are assigned to a node having a node identifier (node ID) that is closest, according to some location determination, to the resource ID. Details of the methods used to determine the location of the identifiers depend on the particular DHT mechanism being used. Nodes may exchange messages in response to a node joining or leaving to maintain the DHTs.

An exemplary Distributed Hash Table (DHT) is defined in an article by I. Stoica et al. entitled, "Chord: A Scalable Peer-To-Peer Lookup Service for Internet Applications," in ACM SIGCOMM'01, August 2001. A large scale Chord network may be built using a huge hash key space, such as a set of 128 bit integers and a cryptographic hash function such as the SHA-1 function, defined in a standard entitled "Secure Hash Standard," NIST, FIPS PUB 180-1, April 1995.

FIGS. 1A and 1B are schematic diagrams of a conventional network using a Chord topology. FIG. 1A illustrates a DHT for the conventional network prior to network resource 5 joining and FIG. 1B illustrates the updating of the DHT for the conventional network as network resource 5 joins the conventional network.

Referring now to FIG. 1A, an exemplary Chord P2P network 100 includes nodes with node IDs 0-15 (hereafter referred to as nodes 0-15) and resources (not shown) assigned identifiers from an identifier space. Network 100 may include a physical network 110, a plurality of physical nodes, 120, 125, 130, 135 and 140, a plurality of processors 150, 155, 160, 165 and 170 which communicate with each other via physical nodes 120, 125, 130, 135 and 140, respectively. Physical network 110 may include any number of physical nodes and corresponding processors. Each processor 150, 155, 160, 165 and 170 may include a finger table that forms a portion of a DHT 180.

In the example illustrated, the number of bits assigned to each identifier is 4 and, thus, the identifier space is 0-15. The number of bits, however, may be any number and may be denoted as m. Thus, the identifier space may consist of numbers from 0 to $2^m-1$. Modulo $2^m$ is used for numeric operations and, thus, the identifier space may be ordered in a circular fashion, forming an identifier circle, called a Chord ring. A resource ID is a hash key generated from the name of the resource. As described above, it may be desirable to use a cryptographic hash function such as SHA-1.

A resource with key k may be assigned to the first node having a node ID that is equal to or that follows k in Chord ring 100. Such a node is called the successor of key k, denoted by successor(k). Successor(k) is the first node clockwise from k in the Chord ring 100. Predecessor(k) is the first node counter-clockwise from k in the Chord ring 100. With respect to a particular node, for example, node 2, the next node in Chord ring 100 (e.g., as illustrated by the node which is the next in a clockwise orientation) is called its successor (i.e., node 9) and the previous node (the node counter clockwise) in the Chord ring 100 is its predecessor (i.e., node 0).

Each node is linked to (e.g., tracks), in a finger table, m other nodes called fingers that are the successors of keys $n+2^{i-1}$ for each $i=1, \ldots, m$. For any particular node, the nodes identified in its finger table are neighboring nodes, since these nodes are reachable in one hop. Further, a particular node may keep track of its predecessor node. Each node has many entries pointing to nearby nodes, and fewer entries pointing to more remote nodes. These finger tables are populated when a respective node joins the Chord ring 100, and are maintained via communication among various nodes during the operation of Chord ring 100.

A resource with resource ID k is stored by successor(k). As nodes join or leave, resources may be stored on different nodes. Thus, information related to nodes is exchanged as nodes join and leave the network. If a node failure occurs, redundant information maintained in successor and predecessor nodes of the first node may be used to maintain Chord ring 100.

Communications may be routed based on a characteristic of the finger tables, namely that nodes have more information about nodes (node IDs) closer to their identifier space than those further away. When locating a resource with a particular resource ID, for example, a lookup operation may be used. The node initiating the operation (e.g., a first node) may forward a query to a node from its finger table (e.g., a second node) that is either successor(resource ID) or a node with the largest node ID that is smaller (modulo $2^m$) than k. This process may be repeated, if necessary, from node to node until successor(k) is reached. That is, the second node may forward the query to another node (a third node) based on the finger table of the second node and this process may be repeated until successor(k) is reached. A finger of node n is successor (k) if the finger is the successor of $n+2^{i-1}$ for such that key k is equal to or greater than $n+2^{i-1}$ and the finger's node ID is equal to or greater than key k. That is, if, for a certain $i=1, \ldots, m$, $n+2^{i-1} \leq k \leq$ successor $(n+2^{i-1})$, then successor$(n+2^{i-1})$ is also successor(k). During the forwarding steps, the query may reach predecessor(k). The successor of predecessor(k) is successor(k), and thus predecessor(k) forwards the query to successor(k). A node knows if it is successor(k) if its predecessor's node ID is smaller than key k (modulo $2^m$). Upon receiving the query, successor(k) replies to the query originator (the first node) with the requested information corresponding to the key if it has the information requested in the query. Otherwise, successor(k) replies to the query originator with a lookup failure message. In a Chord ring that has N nodes, the query reaches successor(k), on average, in log(N) hops. That is, if the Chord ring has 64,000 nodes, any query for resource k, on average, takes 16 hops to reach successor (k). This characteristic is the same for many known DHTs such as Chord, Pastry, and Tapestry.

Typical query messages contain the target resource name or identifier and a Time-to-Live (TTL) value. Intermediate nodes forwarding the query messages may decrement the TTL value.

To facilitate proper operation of the Chord ring 100, each node maintains its finger table and as a node joins or leaves the network 100, Chord finger tables throughout the Chord ring 100 are automatically updated accordingly.

In the exemplary system, when a joining node requests to join the network, the joining node applies the hash function of the DHT, for example, to the IP address of the joining node to generate a node ID.

Each finger table may include a resource ID field 185 and a node ID field 190, among others. Each finger table may further include, for example, finger table entries 180-1, 180-2, 180-3 and 180-4. It is understood by one of skill in the art that based on conventional chord methodologies as disclosed above, the entries in each finger table are as shown in FIG. 1A for a Chord ring having nodes 0-15 and processors associated with (joined at) nodes 0, 2, 9, 12 and 15.

As illustrated in FIG. 1B, when node 5 (i.e., the node with node ID 5) joins network 100, it sends a join message to its successor node (i.e., node 9) that it is joining network 100. Node 9 in a reply message includes information relating to its predecessor (i.e., node 2 in this example). Node 5 then looks up its other fingers. Node 5's fingers are successor $(5+2^{i-1})$ for each $i=1, \ldots, m$. In FIG. 1B, node 5's fingers are successor (6), successor(8), successor(9) and successor(14). Because there is no other node between node 5 and node 9, node 5 recognizes that node 9 is successor(6), successor(8) and successor(9). Because node 5 does not know successor(14) yet, node 5 may send a query (not shown) with target resource ID 14. The query may be forwarded to successor(14) as described above. Upon receiving the query, node 15 that is successor(14) may send a reply to node 5. Node 5 then may insert a pointer to node 15 as successor(14) in its finger table. For a Chord network of N nodes, a node may have, on average, log(N) different fingers. A lookup message for each unique finger may take about log(N) hops to forward. Thus, in the process of filling a finger table for a joining node, messages may be propagated in the P2P network and the number of hops to complete this process may be on the order of $\log^2(N)$.

After filling its finger table, the joining node may desirably notify other nodes for which it is a new finger and their finger tables may be updated. In general, for the joining node n and its predecessor p, the arrival notification message desirably may be sent to the nodes whose node ID is r such that $p-2^{i-1} < r \leq n-2^{i-1}$ for $i=1, \ldots, m$, such that node n sends an arrival notification message toward successor $(p-2^{i-1})$ for $i=1, \ldots, m$. The arrival notification message may be forwarded in the same way as a query for resource $(p-2^{i-1})$ is forwarded. Upon receiving the arrival notification message, successor$(p-2^{i-1})$ may update its finger table accordingly and may forward the arrival notification message to its successor if the successor's node ID is equal to or smaller than $n-2^{-1}$. In FIG. 1B, node 12, 15, 0, and 2 update their finger tables to reflect that node 5 joined the network. The communications of the arrival notification messages are denoted by the solid arrows from node 5 to nodes 12, 15, 0 and 2. Each arrival notification message is forwarded, on average, for log(N) hops until it reaches its destination in a similar manner to a query message. Finger table updates include: (1) node 12 updating its last finger table entry 180-4 to (4:5) to associate resource ID 4 with node 5; (2) node 15 updating its third finger table entry 180-3 to (3:5) to associate resource ID 3 with node 5; (3) node 0 updating its third finger table entry 180-3 to (4:5) to associate resource ID 4 with node 5 and (4) node 2 updating its first two finger table entries 180-1 and 180-2 to (3:5) and (4:5), respectively, to associate resource IDs 3 and 4 with node 5. In this way, all finger tables in P2P network 100 may be updated to reflect node 5 joining P2P network 100.

It is appreciated by one of skill in the art that when a new node joins a Chord network, significant traffic is generated to fill the finger table of the joining node and to update the finger tables of the nodes for which the joining node is a new finger. Further, when a node leaves the Chord network, the finger tables of the nodes that point to the leaving node may be updated. Updating these finger tables uses a similar procedure to that described above and also generates significant traffic on the Chord network.

Many known DHTs, for example, those used in other P2P networks, have the same characteristic that significant traffic is generated to maintain the DHT when a node joins or leaves the P2P network.

SUMMARY OF THE INVENTION

The present invention is embodied in a method for joining a network device to a peer-to-peer network. The peer-to peer network includes a plurality of nodes each having a node ID. Each node is associated with a different network device and is assigned at least a successor node and a predecessor node. The method includes the successor node being searched for (looked for) using a look up operation. A joining message, which includes information relating to the joining node, is sent from a node that is joining the peer-to-peer network to the successor and predecessor nodes of the joining node. The node ID of the joining node is used to determine the predecessor and successor nodes. The method further includes a node ID of the predecessor node being received from the successor node by the joining node. The joining node joins the peer-to-peer network updating by the successor and predecessor nodes, exclusive of any other nodes with the information from the joining message. The joining node is sent reply messages, respectively, from the successor and predecessor nodes, and the joining node being updated with information from the successor and predecessor nodes, exclusive of any other node.

The present invention is embodied in a method for a network device to leave a peer-to-peer network. The node that is leaving the peer-to-peer network sends a leave message with information about the leaving node to at least one neighboring node of the leaving node. The neighboring node is a node known to the leaving node. The neighboring node, exclusive of any other node of the plurality of nodes, is updated with the information from the leave message.

The present invention is embodied in a method for a network device to leave a peer-to-peer network. Responsive to the lack of a reply to at least one message sent to the leaving node from at least one neighboring node, the neighboring node, exclusive of any other nodes of the plurality of nodes, is updated to reflect that the leaving node has left the peer-to-peer network.

The present invention is embodied in a method for a network device to leave a peer-to-peer network. The method includes, responsive to non-reception of any message from the leaving node by at least one neighboring node for more than a threshold period, the neighboring node that has not received any message from the leaving node, exclusive of any other nodes of the plurality of nodes, is updated to reflect that the leaving node has left the peer-to-peer network.

BRIEF DESCRIPTION OF THE DRAWINGS

The invention is best understood from the following detailed description when read in connection with the accompanying drawings. It is emphasized that, according to common practice, various features/elements of the drawings may not be drawn to scale. Moreover, in the drawings, common numerical references are used to represent like features/elements. Included in the drawing are the following figures:

FIGS. 1A and 1B (Prior Art) are schematic diagrams of an exemplary conventional peer-to peer network and illustrate a conventional method for a node to join the network;

FIGS. 16, 17, 18, 19, 20, 21 and 22 are flow charts illustrating certain methods of managing communications between or among nodes of a P2P network in accordance with various exemplary embodiments of the present invention.

DETAILED DESCRIPTION OF THE INVENTION

Figure 1B:
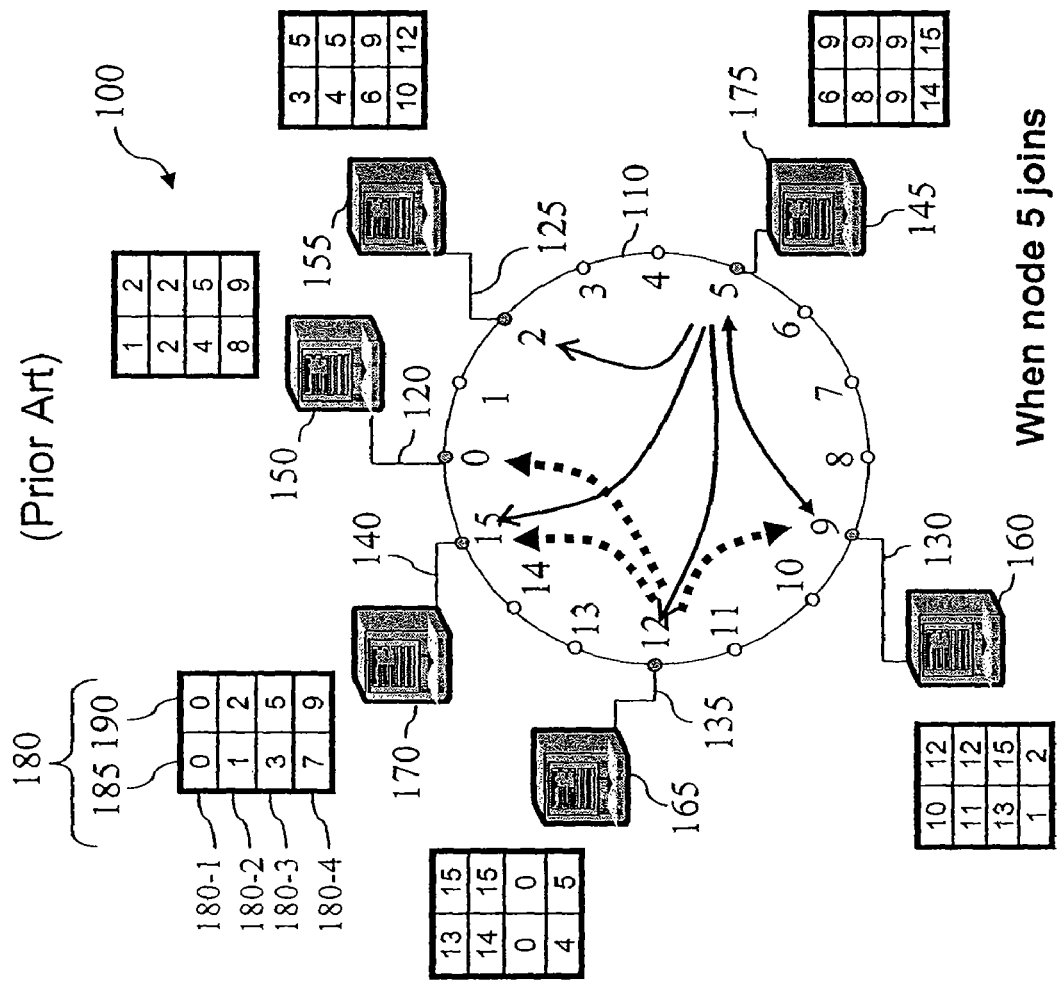

Although the invention is illustrated and described herein with reference to specific embodiments, the invention is not intended to be limited to the details shown. Rather, various modifications may be made in the details within the scope and range of equivalents of the claims and without departing from the invention.

Although certain exemplary embodiments are described in terms of a Chord or a peer-to-peer network, they may be applied to other networks employing DHT's. For example, they may apply to other P2P networks including CAN networks, Pastry networks, and Tapestry networks, among others. Moreover, the term finger table may be generalized in such networks to routing table and the terms successor and predecessor nodes may be generalized in such networks to refer to: (1) nodes that neighbor a particular node (in proximity to the particular node based on the structure of the identification space); (2) nodes that are in the routing table of the particular node or (3) nodes that are known to the particular node.

It is understood by one of skill in the art that the number of messages to fill the joining node's finger table is on the order of $\log^2(N)$ messages. Accordingly, this overhead traffic may significantly impact performance of any P2P network and, in particular, may have a severe effect for large scale networks because the overhead traffic grows exponentially with the number of nodes. Typically, many of the nodes being updated with, for example joining information from these overhead messages do not use the information because in large scale P2P networks the probability of accessing a particular node from another node decreases as the number of nodes in the network increases.

What is needed is a method of managing communication that reduces the number of overhead messages used to maintain the P2P network.

It is contemplated that certain exemplary embodiments of the present invention may include on-demand updating of DHT finger tables such that successor and predecessor nodes are updated with information regarding a respective node and other nodes are updated based on standard messaging (e.g., non-overhead messaging) between or among the nodes of the network.

It should be understood that the methods illustrated may be implemented in hardware, software, or a combination thereof. In such embodiments, the various components and steps described below may be implemented in hardware and/or software.

FIGS. 2, 3, 4 and 5 are schematic diagrams of a P2P network 300 as successively more nodes are added to the network and illustrate a method of managing communications between or among nodes of the network in accordance with an exemplary embodiment of the present invention.

Referring now to FIGS. 2-5, Chord P2P network 300 may include logical nodes 0-31 and resources (not shown) assigned identifiers from an identifier space. Network 300 may further include a physical network 310, one or more physical nodes 320:330 (e.g., a plurality of network interface devices 320 and a corresponding plurality of processors 330). Physical network 310 may include any number of physical nodes and corresponding processors. Each processor 330 may include a finger table that forms a portion of a DHT 340. Each processor 330 may have other connected resources (not shown) and each processor 330 and the other connected resources may vary in the size (i.e., storage capacity and processor power) and in the bandwidth of the connection to network 300.

Network 300 may include for example, mobile nodes and fixed nodes. Mobile nodes refer to nodes having mobile devices coupled thereto (i.e., devices capable of movement to another node on network 300 such as: (1) mobile computers; (2) electronic devices, for example, Personal Digital Assistants (PDAs), cell phones, and (3) other internet appliances, among others). Fixed nodes refer to nodes having substantially fixed, permanent or non-movable devices coupled thereto (i.e., a device which is generally not capable of movement to another node on network 300).

In certain exemplary embodiments, when a node joins P2P network 300, the node and its successor and predecessor nodes are updated based on their respective node IDs. That is, information exchanged between the joining node and its successor and predecessor nodes may be limited to node IDs.

Figure 2:
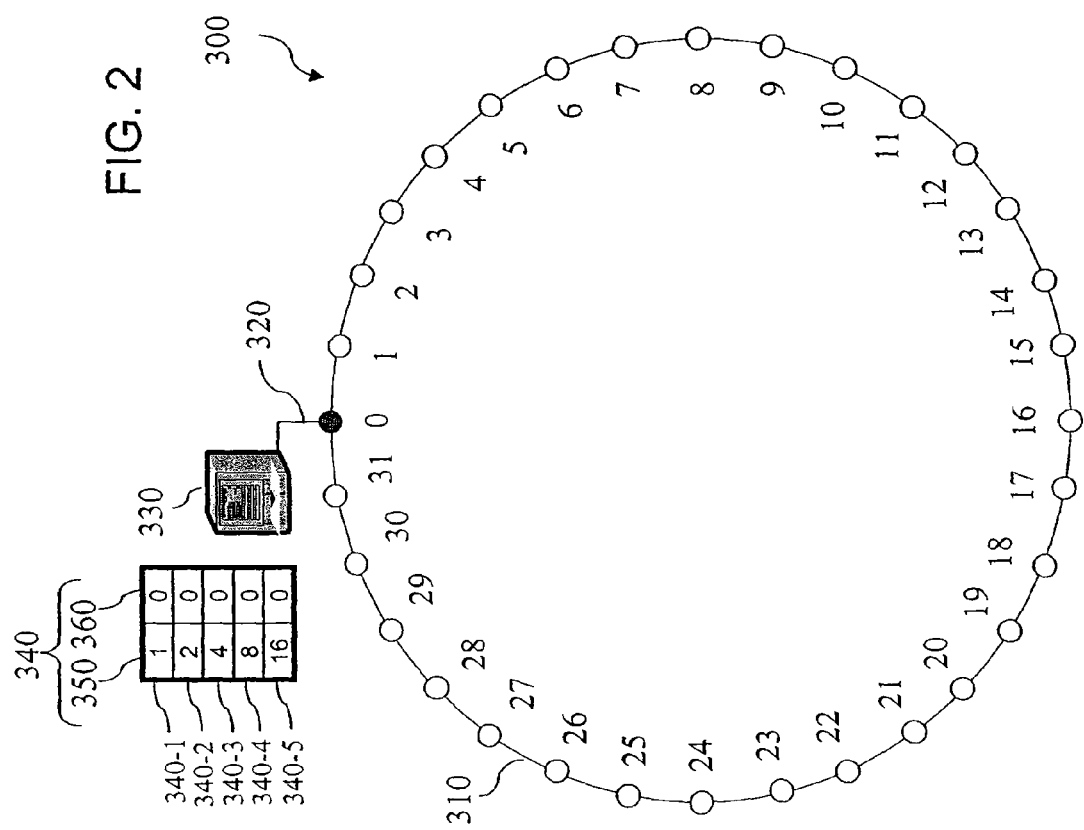
FIGS. 2, 3 and 4 and 5 are schematic diagrams of a P2P network 300 as successively more nodes are added to the network and illustrate a method of managing communications between or among nodes of the network in accordance with an exemplary embodiment of the present invention.

As illustrated in FIG. 2, node 0 may join network 300. It may send a lookup message to it successor (i.e., search for its successor) and send an arrival notification message to the successor node to join P2P network 300. Because node 0 is the only node to join P2P network 300, it is its own successor node. Accordingly, the finger table of node 0 may be established (or updated) to include finger table entries 340-1, 340-2, 340-3, 340-4 and 340-5 with resource ID values and node ID values of (1:0), (2:0), (4:0), (8:0) and (16:0), respectively.

Figure 3:
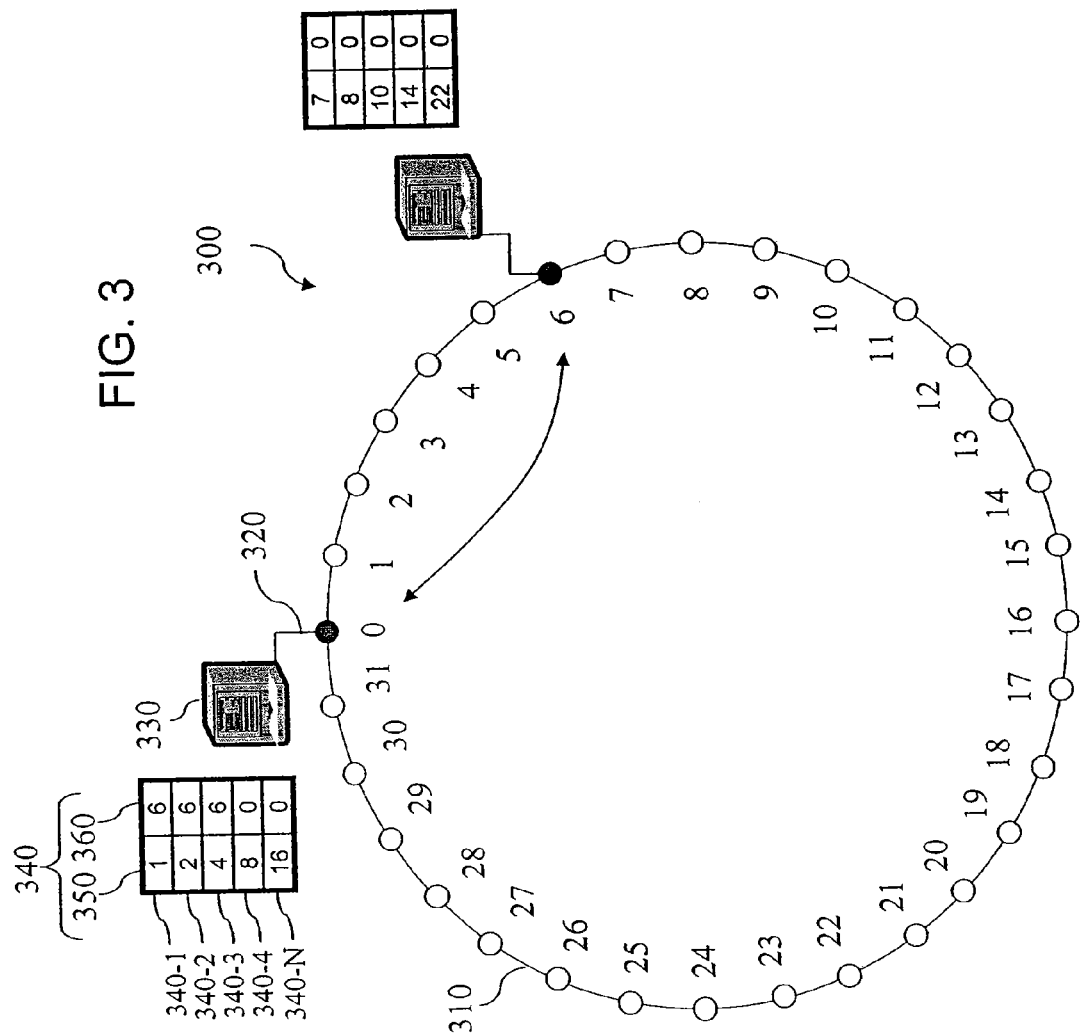

As illustrated in FIG. 3, node 6 may join P2P network 300 after node 0. Node 6 may search for and send an arrival notification message to join P2P network 300 to its successor node (i.e., node 0). Node 0 may send a join message as a reply to node 6. The join message may include the predecessor and successor of node 0 prior to node 6 joining P2P network 300 (in this case the predecessor is node 0 and successor is node 0). The finger table of node 0 may be updated to include finger table entries 340-1, 340-2, 340-3, 340-4 and 340-5 with resource ID values and node ID values of (1:6), (2:6), (4:6), (8:0) and (16:0), respectively. The finger table of node 6 may be established (or updated) to include finger table entries 340-1, 340-2, 340-3, 340-4 and 340-5 with resource ID values and node ID values of (7:0), (8:0), (10:0), (14:0) and (22:0), respectively.

Figure 4:
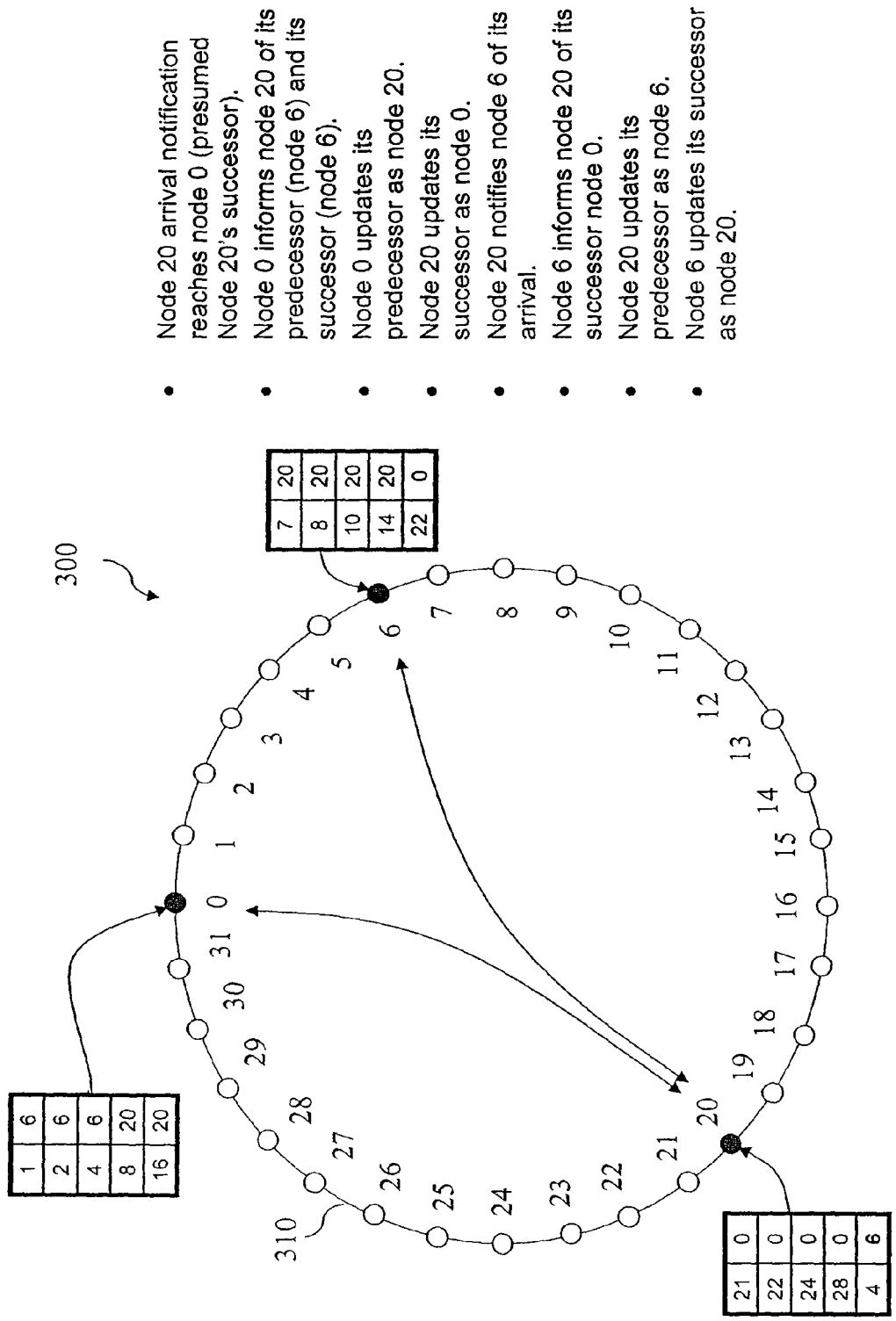

As illustrated in FIG. 4, node 20 may join network 300 after node 0 and node 6. Node 20 may search for and send an arrival notification message to join P2P network 300 to its successor node (i.e., node 0). Node 0 may send a join message as a reply to node 20. The join message may include the predecessor and successor of node 0 (in this case, the predecessor is node 6 and the successor is node 6). Node 20 may send an arrival notification message to its predecessor node (i.e., node 6).

The finger table of node 20 may be established (or updated) to include finger table entries 340-1, 340-2, 340-3, 340-4 and 340-5 with resource ID values and node ID values of (21:0), (22:0), (24:0), (28:0) and (4:6), respectively. The finger table of node 0 may be updated to include finger table entries 340-1, 340-2, 340-3, 340-4 and 340-5 with resource ID values and node ID values of (1:6), (2:6), (4:6), (8:20) and (16:20), respectively. The finger table of node 6 may be updated to include finger table entries 340-1, 340-2, 340-3, 340-4 and 340-5 with resource ID values and node ID values of (7:20), (8:20), (10:20), (14:20) and (22:0), respectively.

The management of finger table entries for node 20, joining nodes 0 and 6 may include: (1) a node 20 arrival notification message reaching node 0 (node 0 presuming itself to be the successor of node 20 based on its knowledge that node 6 is its previous successor); (2) node 0 informing (i.e., sending a message to) node 20 of its predecessor (i.e., node 6) and its successor (i.e., node 6); (3) node 0 updating its predecessor as node 20; (3) node 20 updating its successor as node 0; (4) node 20 notifying node 6 of its arrival (i.e., its joining to P2P network 300); (5) node 6 informing node 20 of its successor node 0; (6) node 20 updating its predecessor as node 6; and (7) node 6 updating its successor as node 20.

Figure 5:
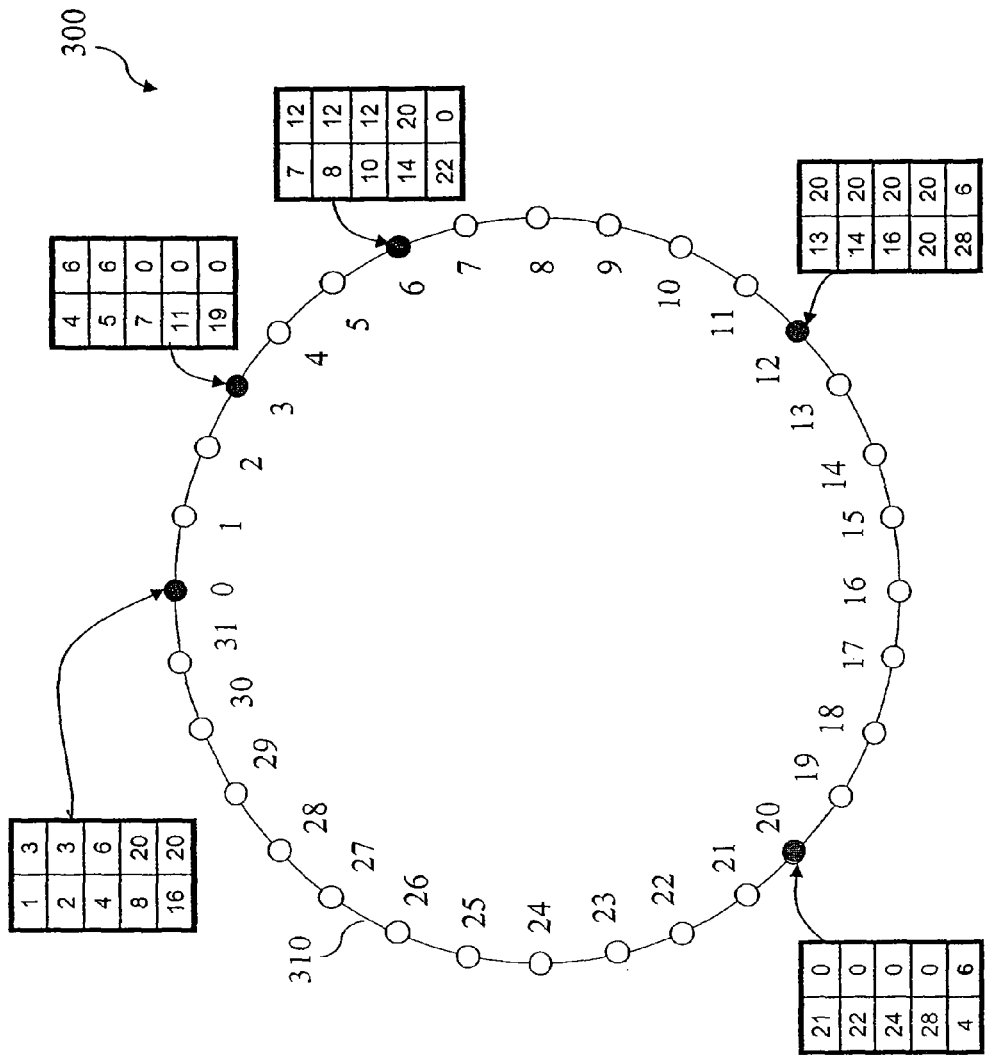

As illustrated in FIG. 5, node 12 may first join P2P network 300 and then node 3 may also join P2P network 300 after nodes 0, 6 and 20. It is appreciated by one of skill in the art that the joining process for additional nodes (i.e., nodes 12 and 3) is similar to that described above with regard to nodes 0, 6 and 20. For example, the joining node sends an arrival notification message which reaches its successor node; (2) the successor node informs the joining node about the successor and predecessor of the successor node; (3) the joining node updates its successor as the successor node; (4) the successor node updates its predecessor as the joining node; (5) the joining node notifies the predecessor node of its joining to P2P network 300; (6) the predecessor node informs the joining node of its successor node; (7) the joining node updates its predecessor as the predecessor node; and (8) the predecessor node updates its successor as the joining node.

It is understood by one of skill in the art that based on the above methodology, the finger table entries for P2P network 300 having nodes 0, 3, 6, 12 and 20 are as shown in FIG. 5.

As is apparent to one skilled in the art, the joining method illustrated by FIGS. 2-5 includes limited updates of finger table entries (e.g., limited to the successor node ID and predecessor node ID of a joining node) to reduce communications overhead. By limiting such communications, however, finger table entry errors may be introduced that may cause routing errors (for example in FIG. 5, at finger table entry 340-4 of node 0, at finger table entries 340-3, 340-4 and 340-5 of node 3 and at finger table entry 340-5 of node 12. In certain exemplary embodiments, routing corrections and finger table update methods are described to identify and correct finger table entries and to reroute messages that encounter routing errors due to incorrect, erroneous or stale finger table entries.

Figure 6:
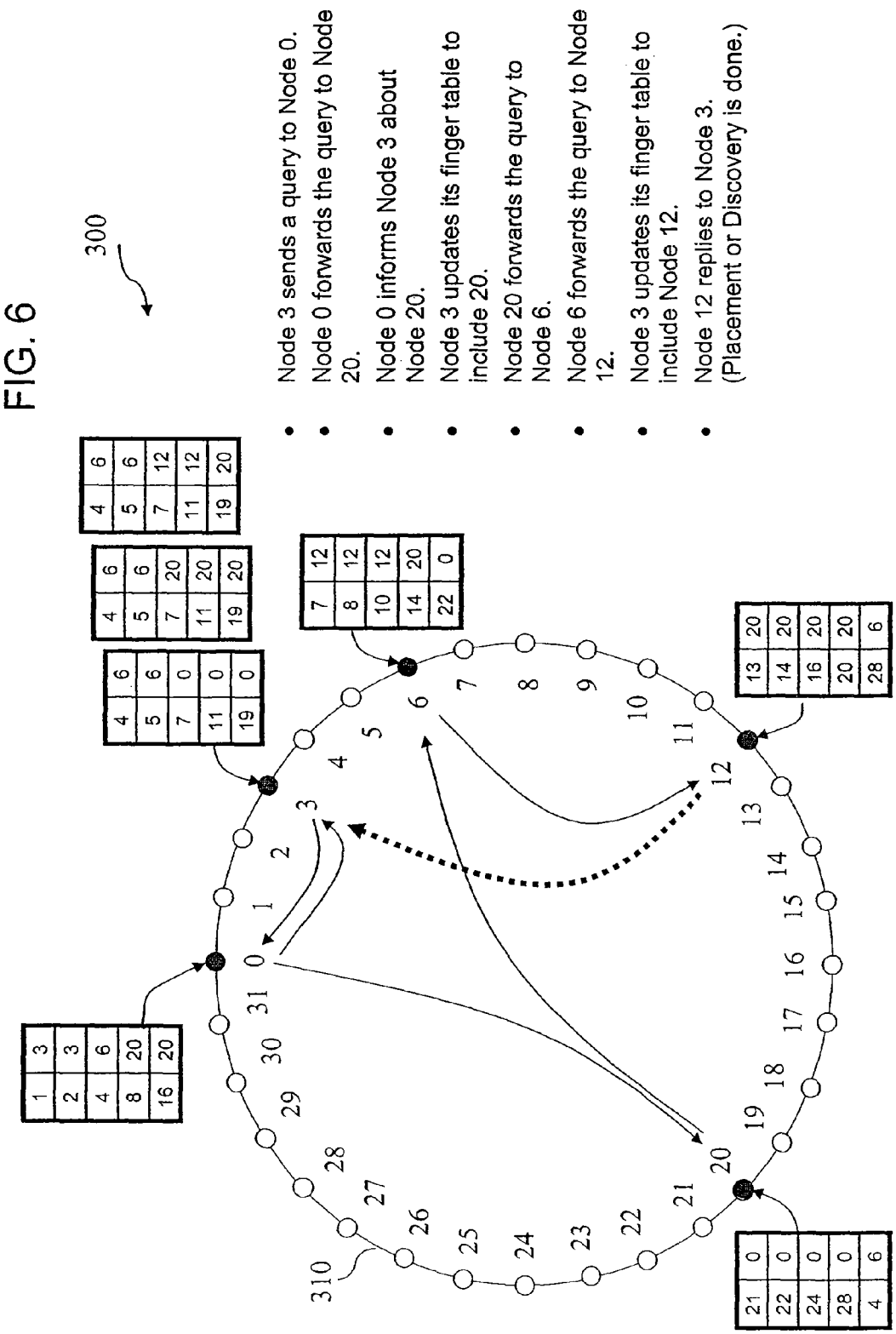
FIGS. 6 and 7 are schematic diagrams of the P2P network 300 and illustrate querying methods for managing communications between or among nodes of the network in accordance with various exemplary embodiments of the present invention.
Figure 7:
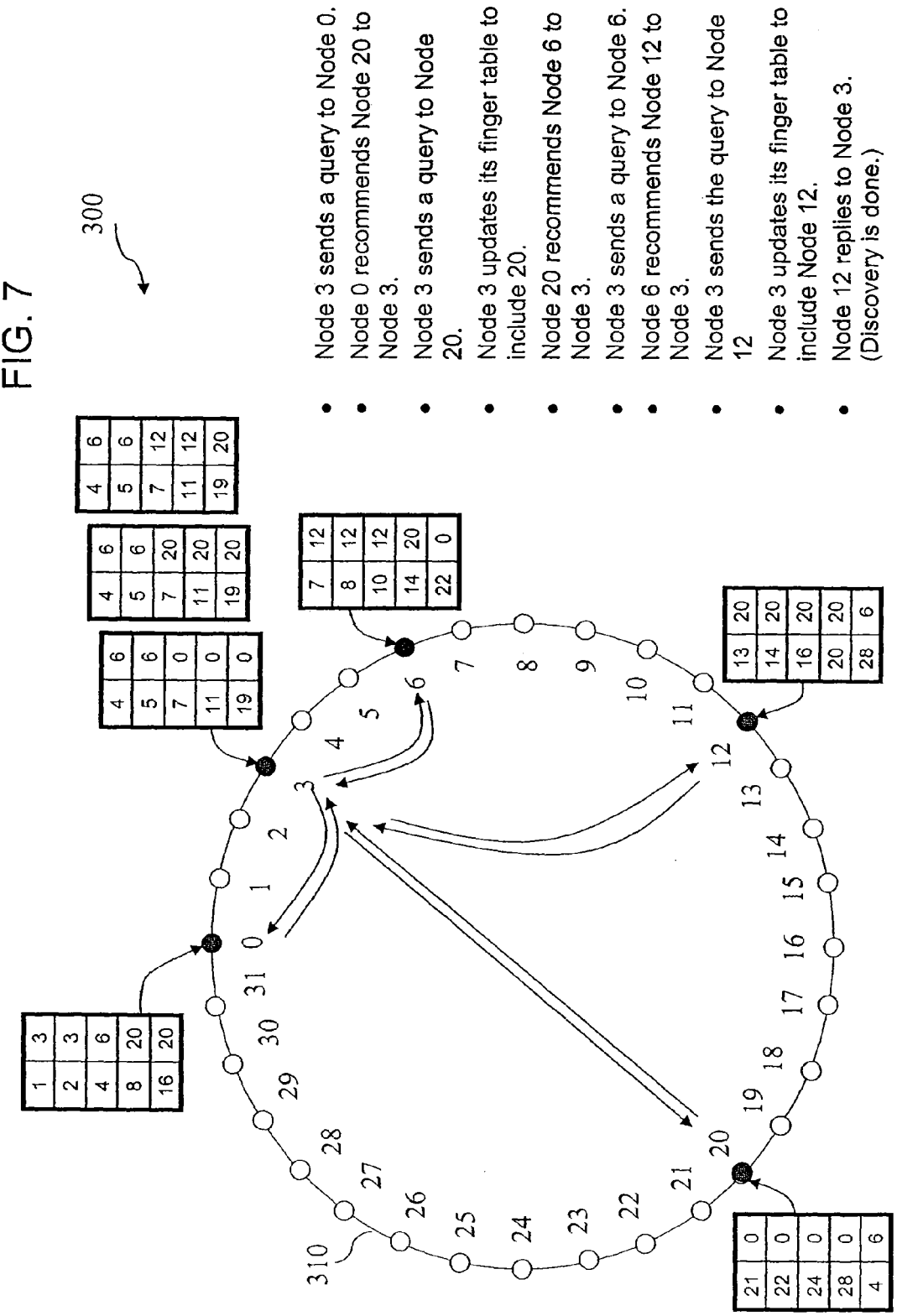

FIGS. 6 and 7 illustrate query methods for P2P network 300 having nodes as arranged in FIG. 5. It is contemplated that such query methods may be used with any P2P network that may experience routing errors due the incomplete, erroneous or stale finger table entries, for example, of non-neighboring nodes.

Routing of queries may be based on the closest node to a resource that is being located. That is, the node ID of the closest node is compared to the resource ID of a resource that is being located. Closest node may refer to the closest successor node or the closest predecessor node based on a comparison of the resource ID of the resource to be located and the finger table entries of a particular finger table.

In certain exemplary embodiments, it may be desirable to route queries (messages) based on a first routing scheme (hereafter referred to as the closest predecessor default routing scheme) in which a query is routed to the finger whose node ID is smaller than and closest to the target resource ID, with the exception that the query is routed to the finger that is the successor of the target resource ID if there is such a finger. The recipient node is the node receiving the query and may be any intermediate node or may be the node responsible for the resource that is being located (i.e., the assignment node).

In other words, the recipient node may determine whether it is the node responsible for the resource by checking whether the resource ID of the resource that is being located is between its predecessor's node ID and its own node ID. If so, then, if it does not manage the resource, the resource is unavailable and routing may end. That is, because each node is responsible for a range of resource ID values, if the node responsible for a particular resource ID is located but the resource is not found by the responsible node then the resource is either unavailable or does not exist on the P2P network. Otherwise, the recipient node may determine whether the resource ID of the resource that is being located is between or equal to the resource ID in resource ID field 350 or 450 and the corresponding node ID in node ID field of any finger table entry stored in the recipient node. If so, the query may be routed to the node ID in field 360 or 460 of that particular finger table entry. This represents the closest successor node to the resource ID of the resource that is stored in the finger table of the recipient node. If the resource ID of the resource that is being located is not in one of these intervals, then the query may be routed via the closest predecessor node stored in the finger table of the recipient.

Although the closest predecessor default routing scheme may be desirable, other types of routing are also possible. One such alternative, a second routing scheme, (hereafter referred to as the closest successor default routing scheme) includes routing of queries to the closest successor node whether or not the resource ID is between the resource ID and the corresponding node ID of a particular finger table entry. In this scheme, like that of the closest predecessor default routing scheme, the recipient node determines whether it is responsible for the resource (e.g., whether it is in charge of managing the range of resource IDs inclusive of the resource ID of the resource that is being located whether of not the resource actual exists or is available), and if so routing stops. If it is not, then the recipient node determines whether the resource ID of the resource that is being located is between an interval (inclusive of the endpoints of the interval) corresponding to the resource ID in resource ID field 350 or 450 of the first finger table entry (i.e., 340-1 or 440-1) and the node ID of node ID field 360 or 460 of the last finger table entry (in this case 340-5 or 440-5). If the resource ID of the resource is in this range, then the query may be routed based on the closest successor node to the resource ID of the resource that is being located which is stored in the recipient node's finger table. Otherwise, if the recipient node is not responsible for the resource, the query may be routed to the closest predecessor node that is stored in the recipient node's finger table. the exemplary embodiment illustrated in FIG. 6, routing is based on the closest predecessor default routing scheme, however, other schemes may be possible.

Now referring to FIG. 6, when node 3 searches for resource (node) 11, node 3 may send a query to node 0 based on finger table entry 340-4 (i.e., (11:0) in its finger table. This is because resource (node) 11 is in the interval between resource ID 11 and corresponding node ID 0 of finger table entry 340-4 of node 3. Thus, the query is forwarded to node 0 which is the closest successor node stored in the finger table 340 of node 3. Node 0 may then forward the query to node 20 (the closest successor node that is stored in the finger table of node 0) based on finger table entry 340-4 (i.e., (8:20)) in its finger table.

After reception by node 20 of the forwarded query from node 0, node 20 may determine that resource 11 is not between any finger table intervals. That is, resource 11 is not between (including the end points of the range) any of the finger table intervals of node 20 (i.e., intervals (21:0), (22:0), (24:0), (28:0) or (4:6) corresponding to finger table entries 340-1, 340-2, 340-3, 340-4 and 340-5, respectively). Thus, the query is forwarded to the closest predecessor (i.e., node 6) to resource 11 based on finger table entry 340-5 of node 20.

After reception by node 6 of the forwarded query from node 20, node 6 may determine that the closest successor node to node 11 in its finger table is node 12 based on finger table entry 340-3 (i.e., (10:12)). After reception by node 12 of the forwarded query from node 6, node 12 may determine that it is responsible for the resource (node) 11. That is, it succeeds resource 11 and its predecessor (i.e., node 6) precedes resource 11. Because node 12 is responsible for the particular resource that is being located routing ends and it may respond to the query directly to node 3. The reply message may be either a query failure message, if the resource (node) does not exist on P2P network 300 or, otherwise, the information resulting from the query request.

After reception of the reply message from node 12, finger table entries 340-3 and 340-4 of node 3 may be updated to (7:12) and (11:12), respectively, based on the reply from node 12.

In certain embodiments, a traceback (not shown) may be performed to update the finger tables of each node, if appropriate, in the routing path (i.e., the routing path being nodes 0, 20, 6, 12 and 3) with updated node information. The traceback may include a message that includes information regarding all of the nodes in the routing path being sent in a reverse path (i.e., from node 3 in a sequence to nodes 12, 6, 20 and 0). It is contemplated that information regarding the nodes traversed by the original query may be added to the original query as it is routed to provide the routing and update information used in the traceback.

In other exemplary embodiments, updating of previous nodes in a routing path may be completed based on predetermined criteria. For example, one or more previous nodes in the routing path may be updated by a subsequent node in the routing path based on a determination of a routing loop, an inactive node or some other criteria. The other criteria, for example, may include the creation of routing delays due to the incomplete, stale or incorrect routing information in excess of a predetermined threshold delay.

Although node 12, for reasons of brevity, is the only node described as checking for whether it is responsible for the resource, such checking may be completed by each respective recipient node.

FIG. 7 is a schematic diagram of P2P network 300 illustrating a method of managing communications between or among nodes of P2P network 300 in accordance with yet another exemplary embodiment of the present invention.

As is apparent to one of skill in the art, the main difference between the method illustrated in FIG. 7 and that illustrated in FIG. 6 is that in FIG. 7, every recipient of a query message may send node 3 (the originator node) a reply that may include information about a recommended next hop for the query or may include the requested resource.

Although it is illustrated in FIG. 7 that node 3 controls each message and reply thereto, it is contemplated that in certain exemplary embodiments, a message in some cases may be forwarded from an intermediate node without any reply by the intermediate node to the originator node to increase the efficiency of the query while in other cases the intermediate node may reply directly to the originator node. For example, when a routing error (e.g., a routing loop, an inactive node or other error condition, among others) is detected, it may be desirable to reply directly to the originator node so that the originator node may update it finger table appropriately. If an error is not encountered by the intermediate node, it may be desirable to forward the query directly to the next node in the routing path to avoid delays due to the additional replies to the originator node.

In the exemplary embodiment illustrated in FIG. 7, routing is based on the closest predecessor default routing scheme, however, other schemes may be possible.

Now referring to FIG. 7, when node 3 searches for node 11, node 3 may send a query to node 0 based on finger table entry 340-4 (i.e., (11:0) in its finger table. Node 0 corresponds to the closest successor node to node 11 that is stored in finger table 340 of node 3. Node 0 may then send a reply message to node 3, and may recommend sending a query message to node 20 based on finger table entry 340-4 (i.e., (8:20)) of finger table 340 of node 0. Node 3 may update its finger table to include node 20. That is, finger table entries 340-3, 340-4 and 340-5 may be updated to (7:20), (11:20) and (19:20), respectively, based on the reply from node 0 to node 3.

Node 3 then may send a query to node 20. Node 20 may, in a reply message, recommend sending a query message to node 6 based on finger table entry 340-5 (i.e., (4:6) of finger table 340 of node 20). That is, like the method illustrated in FIG. 6, node 20 may determine that the query should be routed to the closest predecessor (i.e., node 6) to resource 11 in its finger table, because resource 11 is not between (including the end points of each range) any of the intervals of the finger table entries 340-1, 340-2, 340-3, 340-4 and 340-5 of node 20. Node 3 then may send a query to node 6 based on the recommendation from node 20. Node 6 may send a reply message to node 3 and recommend sending a query to node 12 based on the closest successor node stored in its finger table (i.e., entry 340-3 (10:12)). Node 3 may update its finger table to include node 12. That is, finger table entries 340-3 and

340-4 may be updated to (7:12) and (11:12), respectively, based on the reply from node 6 to node 3. Node 3 then may send a query to node 12. Node 12 may determine that it is responsible for (i.e., is in charge of managing) resource 11 because it succeeds resource 11 and its predecessor (i.e., node 6) precedes resource 11 and, thus, routing may end and a reply message may be sent to node 3. The reply message may be either a query failure message, if the resource (node) does not exist on P2P network 300 or, otherwise, the information resulting from the query request.

Although a lookup query is illustrated in FIGS. 6 and 7, it is contemplated that similar routing methods may be used to place a resource at a node. For example, one skilled in the art would recognize that identical routing methods to those illustrated in FIGS. 6 and 7 may be used with a placement message to place resource 11.

FIGS. 8, 9, 10 and 11 are schematic diagrams of a P2P network 400 as successively more nodes are added to the network and illustrate a method of managing communications between or among nodes of the network in accordance with yet another exemplary embodiment of the present invention.

Referring now to FIGS. 8-11, Chord P2P network 400 is similar to that of Chord P2P network 300 with the exception that the replies by the predecessor and successor of the joining node to the arrival notification messages include their finger table information. The joining node may update its finger table entries based on this finger table information from its predecessor and successor nodes. By contrast, in P2P network 300 the joining node updates its finger table based on only the node IDs of its successor and predecessor nodes.

In certain exemplary embodiments, when a node joins P2P network 400, the node and its successor and predecessor nodes are updated based on their respective finger table information. The information that is exchanged between the joining node and its successor and predecessor nodes may be include the finger table entry information and may not be limited to just node IDs of the successor and predecessor nodes.

Referring now to FIGS. 8-11, P2P network 400 includes logical nodes 0-31 and resources (not shown) assigned identifiers from an identifier space. Network 400 may further include a physical network 410, one or more physical nodes 420:430 (e.g., a plurality of network interface devices 420 and a corresponding plurality of processors 430). Physical network 410 may include any number of physical nodes and corresponding processors. Each processor 430 may include a finger table that forms a portion of a DHT 440.

Figure 8:
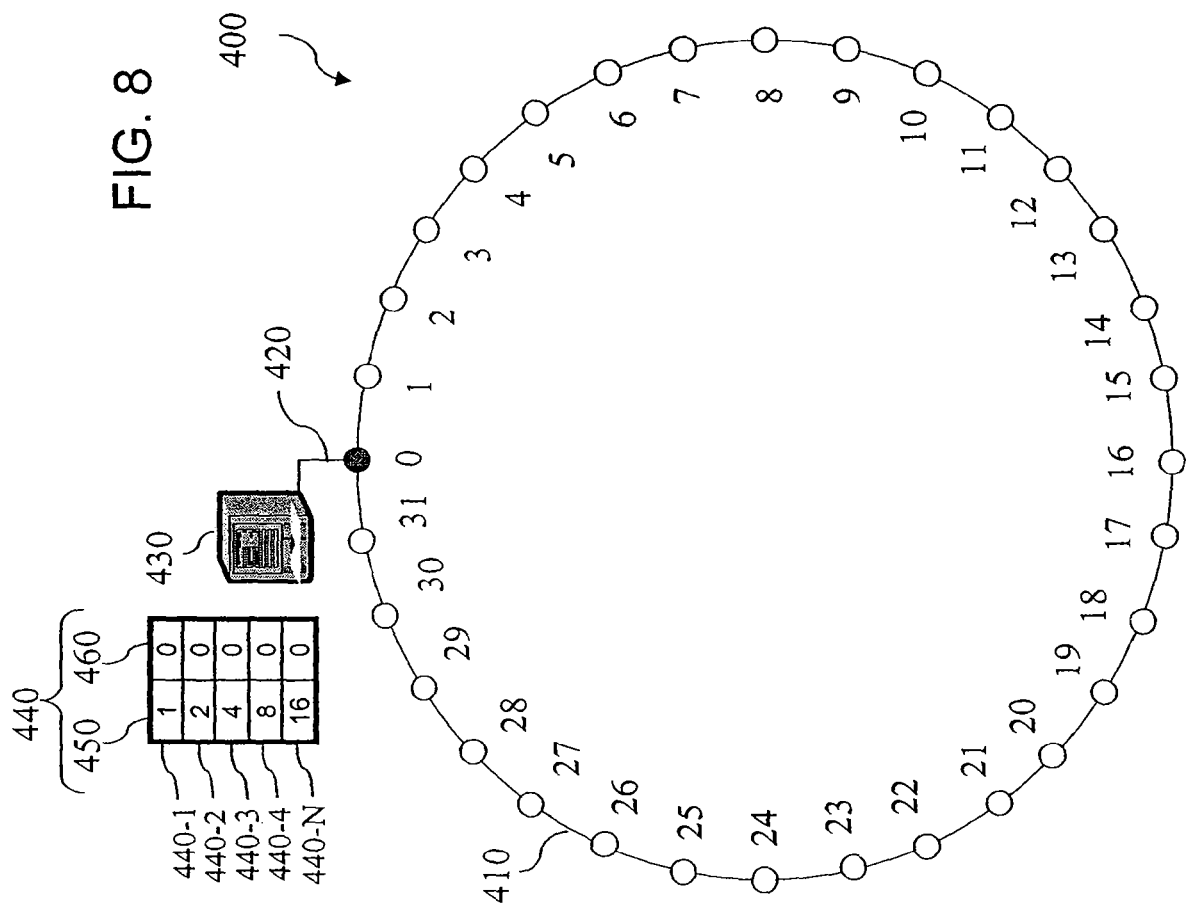
FIGS. 8, 9, 10 and 11 are schematic diagrams of a P2P network 400 as successively more nodes are added to the network and illustrate a method of managing communications between or among nodes of the network in accordance with yet another exemplary embodiment of the present invention.

As illustrated in FIG. 8, node 0 may join P2P network 400. Node 0 may search for and send to its successor an arrival notification message for it to join network 400. Because node 0 is the only node joined to P2P network 400, its successor and predecessor are respectively, node 0. Accordingly, the finger table of node 0 may be established (or updated) to include finger table entries 440-1, 440-2, 440-3, 440-4 and 440-5 with resource ID values and node ID values of (1:0), (2:0), (4:0), (8:0) and (16:0), respectively.

Figure 9:
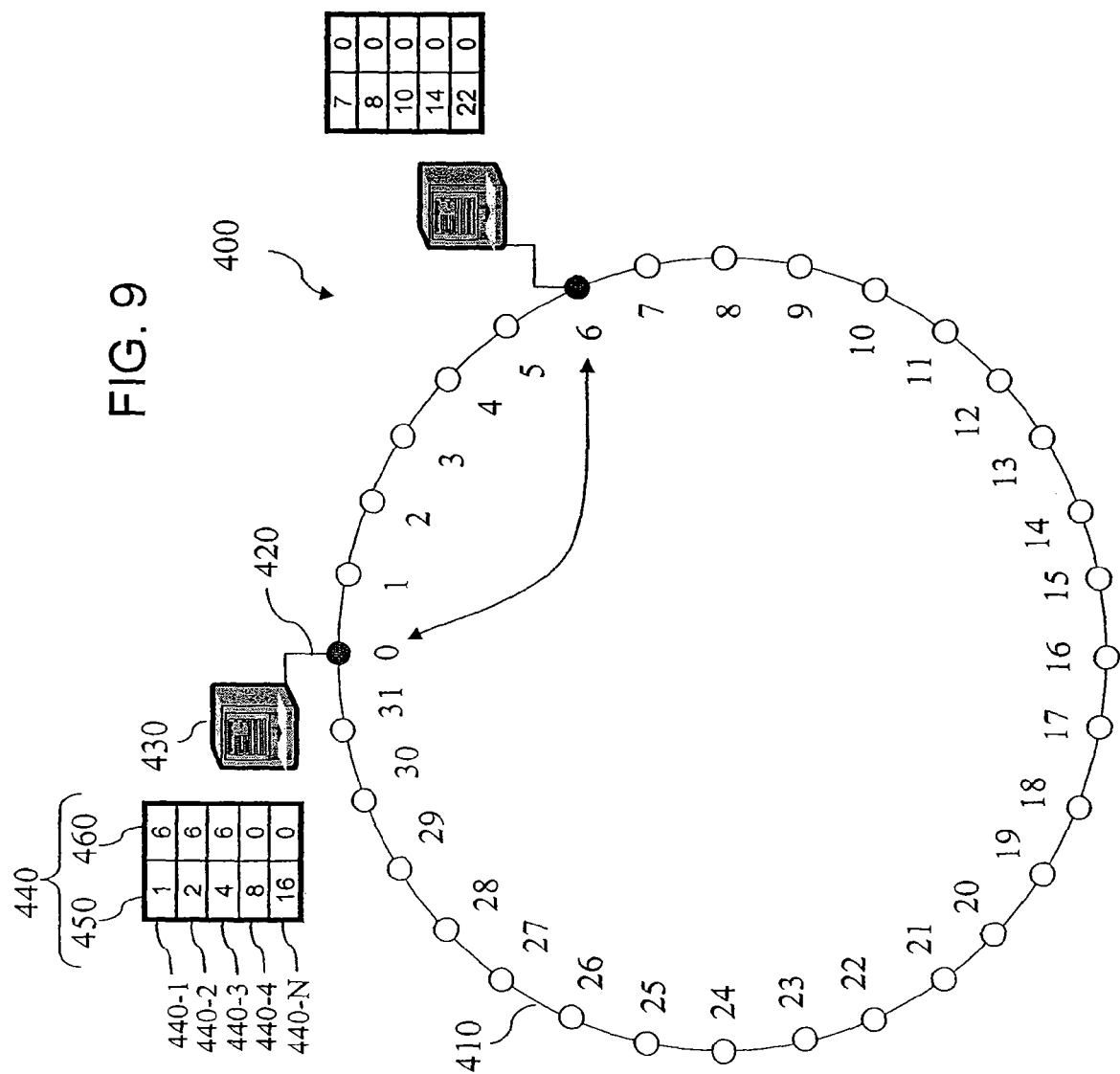

As illustrated in FIG. 9, node 6 may join network 400 after node 0. Node 6 may search for (e.g., using a lookup message) and send to its successor (i.e., node 0), an arrival notification message to join P2P network 400. Successor node 0 may send a join message as a reply to node 6. The join message may include the finger table entry values of any successor nodes (in this case node 0) and the predecessor node ID (in this case the predecessor node is 0). The finger table of node 0 may be updated to include finger table entries 440-1, 440-2, 440-3 with resource ID values and node ID values of (1:6), (2:6), (4:6), respectively. The finger table of joining node 6 may be updated to include finger table entries 440-1, 440-2, 440-3, 440-4 and 440-5 with resource ID values and node ID values of (7:0), (8:0), (10:0), (14:0) and (22:0), respectively.

Figure 10:
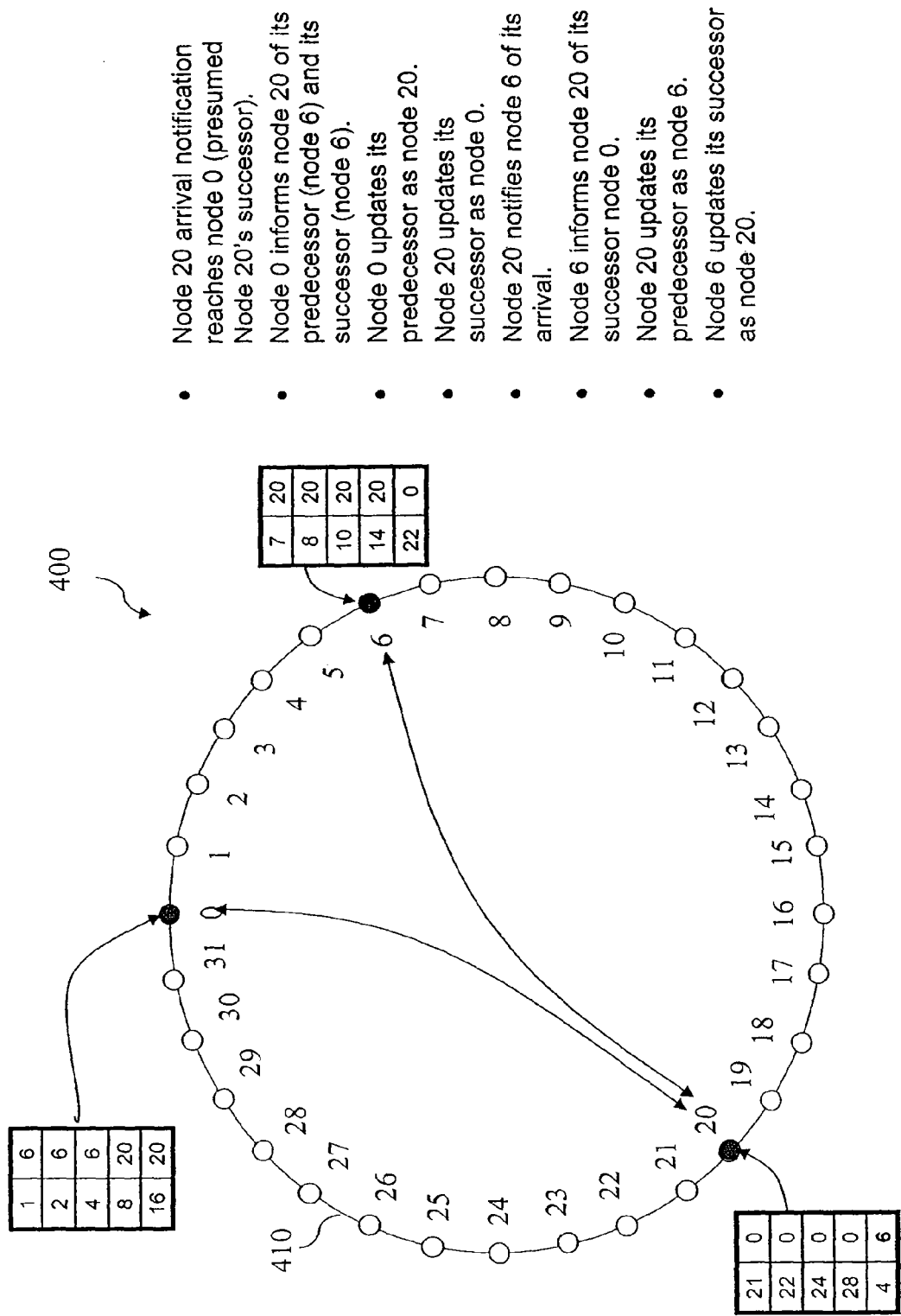

As illustrated in FIG. 10, node 20 may join network 400 after node 0 and node 6. Node 20 may search for (e.g., via a lookup message) and send to its successor (i.e., node 0), an arrival notification message for it to join P2P network 400. Successor node 0 may send a join message as a reply message to node 20. The join message may include the predecessor and successor of node 20 prior to node 20 joining network 400. In this case, the successor is node 6 and the predecessor is also node 6. Node 20 may send an arrival notification message to its predecessor node (i.e., node 6) and node 6 may reply to the arrival notification message.

More particularly, the finger table of node 20 may be established (or updated) to include finger table entries 440-1, 440-2, 440-3, 440-4 and 440-5 with resource ID values and node ID values of (21:0), (22:0), (24:0), (28:0) and (4:6), respectively. The finger table of successor node 0 may be updated to include finger table entries 440-4 and 440-5 with resource ID values and node ID values of (8:20) and (16:20), respectively. The finger table of predecessor node 6 may be updated to include finger table entries 440-1, 440-2, 440-3 and 440-4 with resource ID values and node ID values of (7:20), (8:20), (10:20) and (14:20), respectively.

Figure 11:
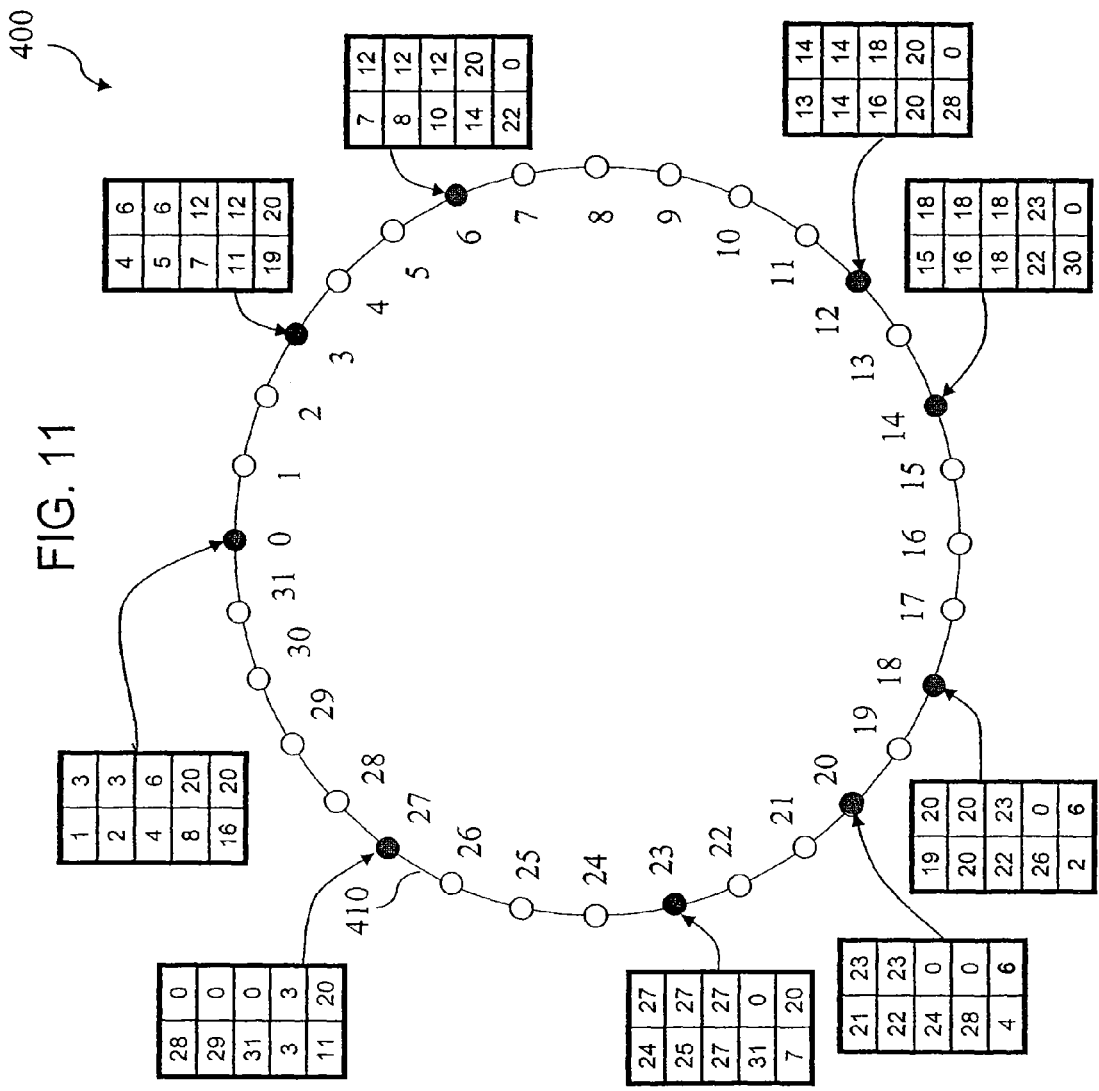

As illustrated in FIG. 11, nodes 12, 3, 23, 18, 14 and 27 may join P2P network 400 in that sequence, after nodes 0, 6 and 20. It is appreciated by one of skill in the art that the joining process for additional nodes (i.e., nodes 12 and 3, 23, 18, 14 and 27) is similar to that described above with regard to nodes 0, 6 and 20. For example, the joining node may lookup it successor and send an arrival notification message to its successor node; (2) the successor node may inform the joining node about the predecessor of the successor node and may also provide its finger table information to the joining node; (3) the joining node may establish or update its finger table based on the finger table information provided by the successor node; (4) the successor node may update its predecessor as the joining node; (5) the joining node may notify the predecessor node about it joining P2P network 400; (6) the predecessor node may inform the joining node of its successor and may also provide its finger table information to the joining node; (7) the joining node may update its finger table based on the finger table information from its predecessor node and the joining node may update its predecessor as the predecessor node; and (8) the predecessor node may update its successor as the joining node.

It is appreciated by one of skill in the art that based on the above methodology, the finger table entries for P2P network having nodes 0, 3, 6, 12,14, 18, 20, 23 and 27 are as shown in FIG. 11.

As is apparent to one skilled in the art, the method illustrated using P2P network 400, similar to that of P2P network 300, includes limited updates of finger table entries (e.g., the updates are limited to certain node—the joining node and its successor and predecessor nodes—) to reduce communications overhead. By limiting such communication, however, finger table entry errors may be introduced that may cause routing errors (for example in FIG. 11, at finger table entries 440-4 and 440-5 of node 0, at finger table entries 440-4 and 440-5 of node 6, at finger table entries 440-4 and 440-5 of node 18, at finger table entry 440-3 of node 20, at finger table entry 440-5 of node 23 and at finger table entry 440-5 of node 27).

Figure 12:
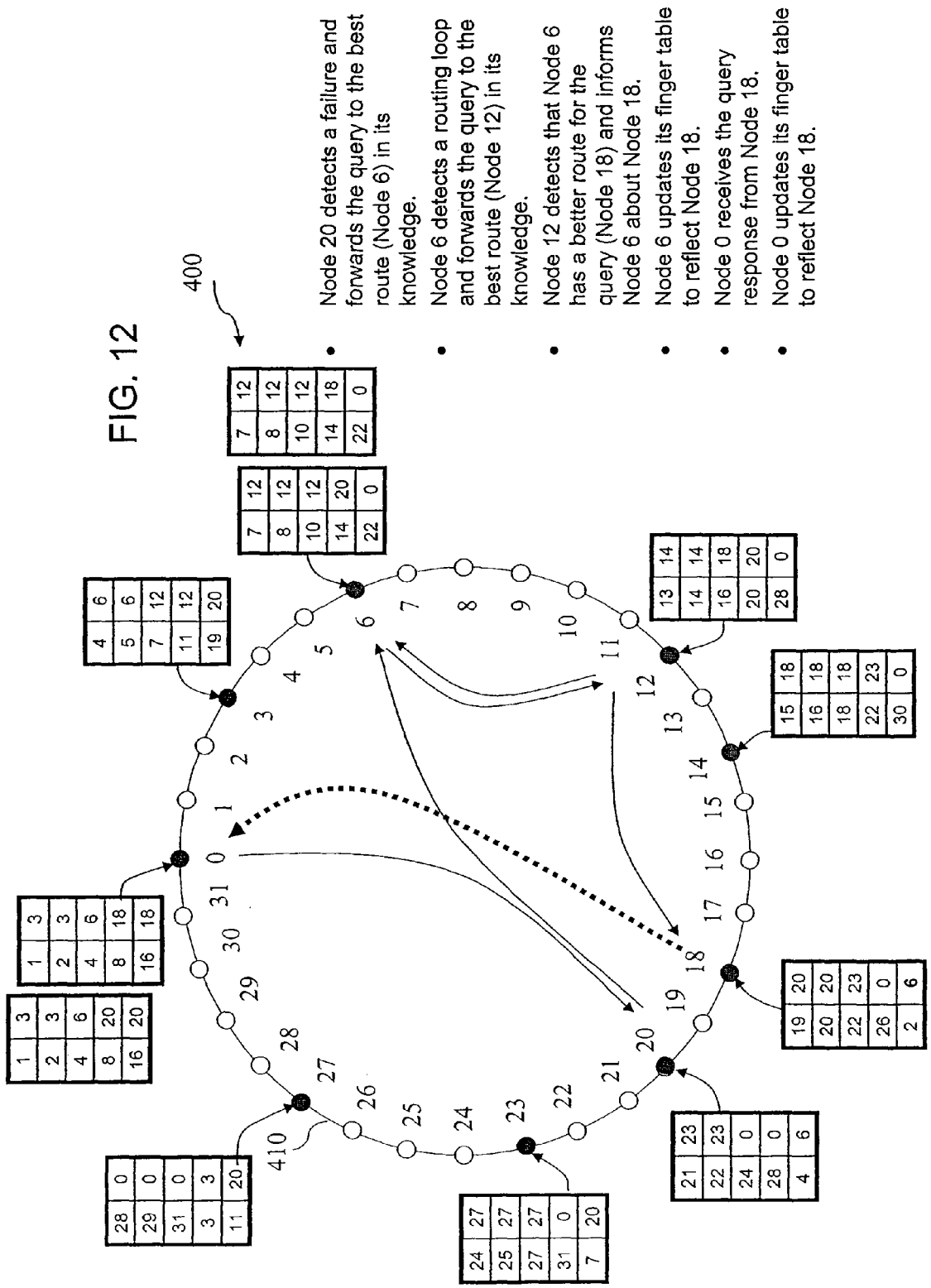
FIGS. 12, 13, 14 and 15 are schematic diagrams of the P2P network 400 and illustrate querying methods for managing communications between or among nodes of the network in accordance with various exemplary embodiments of the present invention.

FIG. 12 is a schematic diagram of P2P network 400 illustrating a query method of managing communications between or among nodes of the P2P network accordance with yet another exemplary embodiment of the present invention.

In the exemplary embodiment illustrated in FIG. 12, routing is based on the closest predecessor default routing scheme, however, other schemes may be possible.

Now referring to FIG. 12, when node 0 searches for resource (node) 16, node 0 may send a query to node 20 (i.e., the closest successor node to node 16 that is stored in finger table 440 of node 0). Each recipient node may check for a routing failure (for example, if the recipient node succeeds the resource ID of the resource that is being located then whether the predecessor of the recipient node (i.e., node 18) succeeds resource 16 that is being located and/or whether a routing loop has occurred based on the routing path history stored with the query, among others)

According to certain exemplary embodiments, a routing path history may be added to the query (message) such that node IDs of the source node and each recipient (intermediate) node in the routing path may be added to the routing path history stored in the query to track the history of the nodes visited by the query. Each recipient node may determine whether the node ID corresponding to the closest node in its finger table matches any node ID stored in the routing path history of the query. If so, the respective node may determine that a routing loop exists and route the query based on an alternate node stored in its finger table. It may be desirable that the selection of the alternate node be based on the next closest node in the finger table. For example, if the closest node is a predecessor node, then the next closest predecessor node may be selected and, otherwise, if the closest node is a successor node, then the closest predecessor node may be selected.

According to certain exemplary embodiments, a routing failure may be detected where the resource ID of the resource that is being located is not between the interval (inclusive of the end points of the interval) corresponding to the resource ID in resource field 450 of the first finger table entry (i.e., 440-1) and the node ID of node ID field 460 of the last finger table entry (in this case 440-5). That is, the recipient node first checks for whether it is responsible for the resource and, if not, further checks whether the resource is within the range of node IDs in its finger table. If so, then routing may be based on, for example, the closest predecessor node ID in the finger table of the recipient node to the resource ID of the resource that is being located. Routing to the closest predecessor node ID may further include routing to only those predecessor node IDs that are not in the routing path history (i.e., which do not create a routing loop error).

Thus, node 20 may detect a routing failure because it is not responsible for resource 16. Accordingly, node 20 may forward the query to an alternate node based on, for example, the closest predecessor to resource 16 stored in finger table 440 of node 20. That is, node 20 may send the query to node 6 based on finger table entry 440-5 (i.e., (4:6).

Node 6 may receive the forwarded query from node 20 and check for a routing loop. That is, based on a comparison of finger table entry 440-4 (i.e., (14:20) and the nodes IDs stored in the routing path history (i.e., node IDs 0 and 20 which have been added to the query during the routing process), node 6 may determine that a routing loop error occurred. This is because, the closest successor to resource 16 stored in finger table 440 of node 6 is node 20 and the query has already been forwarded to node 20. Thus, node 6 may forward the query based on an alternate node (e.g., the closest predecessor node stored in finger table 440 of node 6). That is, node 6 may forward the query to node 12 based on finger table entry 440-3 of node 6.

Node 12 may receive the forwarded query from node 6 and may forward the query to node 18 based on finger table entry 440-3 (i.e., (16:18) of node 12. Because a route loop error occurred at node 6, node 6 may inform node 12 about the routing loop error in the query and node 12 may provide a reply message to allow node 6 to update its finger table entry 440-4 from (14:20) to (14:18). When it receives the reply message, node 6 may update its finger table appropriately.

After reception by node 18 of the forwarded query from node 12, node 18 may determine that it is responsible for resource (node) 16. That is, node 18 may determine that it succeeds resource 16 and that its predecessor node 14 precedes resource 16. Node 18 ends the routing of the query and may respond to the query directly to node 0. The reply message may be either a query failure message, if resource 16 does not exist on P2P network 400 or, otherwise, the information resulting from the query request. Node 0 may then update its finger table entry 440-4 from (8:20) to (8:18) and finger table entry 440-5 from (16:20) to (16:18) based on the reply message from node 18.

Although the determination of routing failures and routing loops are only illustrated with respect to nodes 20 and 6, respectively, it is contemplated that each node in the routing path may check for such errors and may provide alternate routing when such errors are detected.

Although it may be desirable to select alternate routing based on the closest predecessor node stored in the finger table of the respective node that is not in the routing path history, other routing selections are possible including any node stored in the finger table of the recipient node other than the closest successor node or a node that is in the routing path history.

Figure 13:
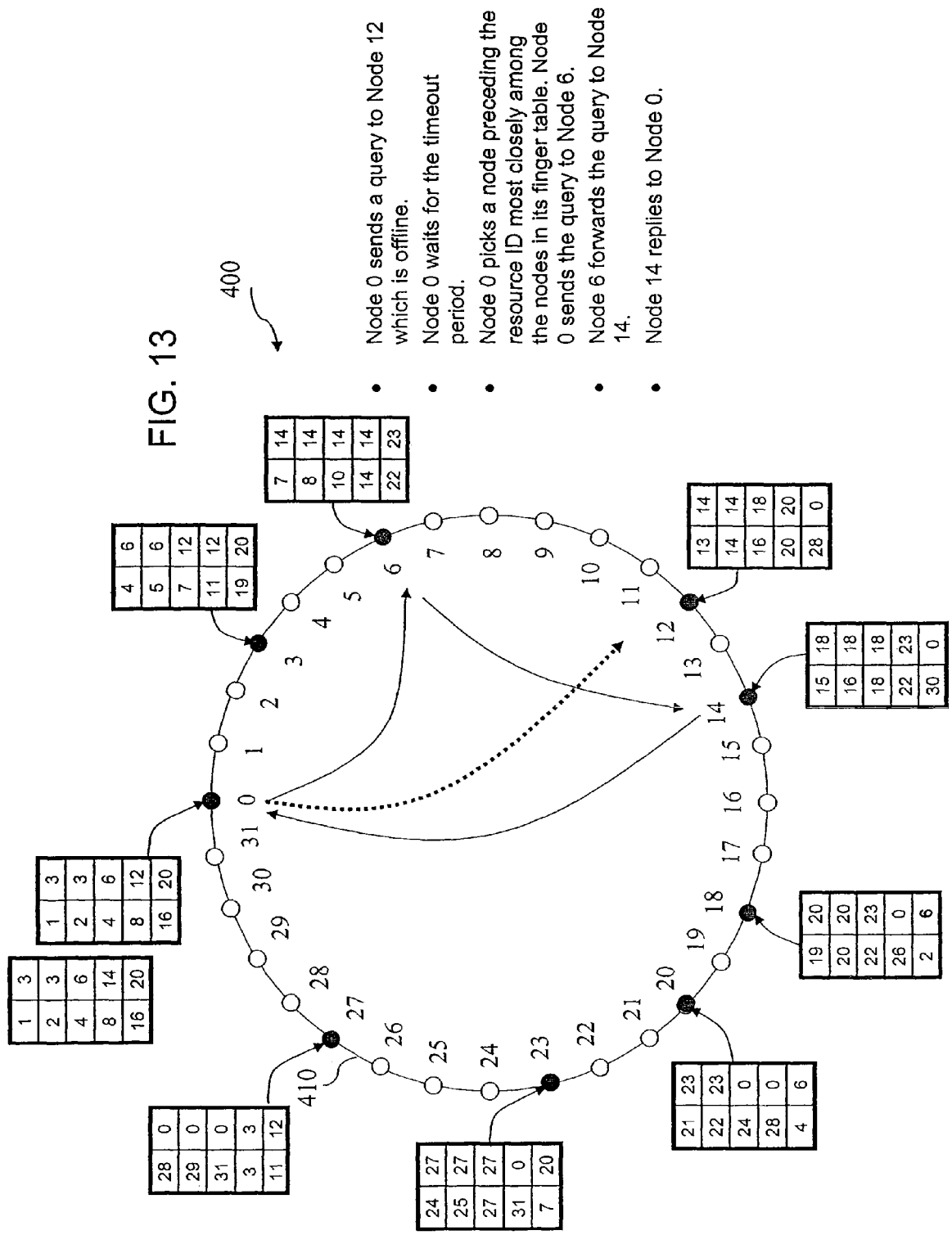

FIG. 13 is a schematic diagram of the P2P network 400 illustrating a query method of managing communications between or among nodes of the network accordance with yet another exemplary embodiment of the present invention.

In the exemplary embodiment illustrated in FIG. 13, routing is based on the closest predecessor default routing scheme, however, other schemes may be possible.

Now referring to FIG. 13, when node 0 searches for node 11, node 0 may send a query to node 12 (the closest successor node to node 11 that is stored in finger table 440 of node 0). If node 12 is offline (i.e., inactive in P2P network 400), nodes 6 and 14 may have been informed that it was leaving the P2P network or, otherwise, through handshake messages may have discovered that node 12 is offline. Moreover, node 0 may wait for a timeout period. After node 12 does not respond to node 0 within the timeout period, node 0 may forward the query to node 6 (the closest predecessor node to node 11 that is stored in the finger table 440 of node 0) based on its finger table entry 440-3.

Node 6, after receiving the query from node 0, may forward the query to node 14 based on the closest successor node stored in its finger table (i.e., finger table entry 440-3 of node 6). Node 14 may receive the forwarded query from node 6, may determine that it is responsible for resource 11 and may respond to the query directly to node 0. The reply message may be either a query failure message, if resource 11 does not exist on P2P network 400 or, otherwise, the information resulting from the query request. Node 0 may then update its finger table entry 440-4 from (8:12) to (8:14) based on the reply message from node 14.

Figure 14:
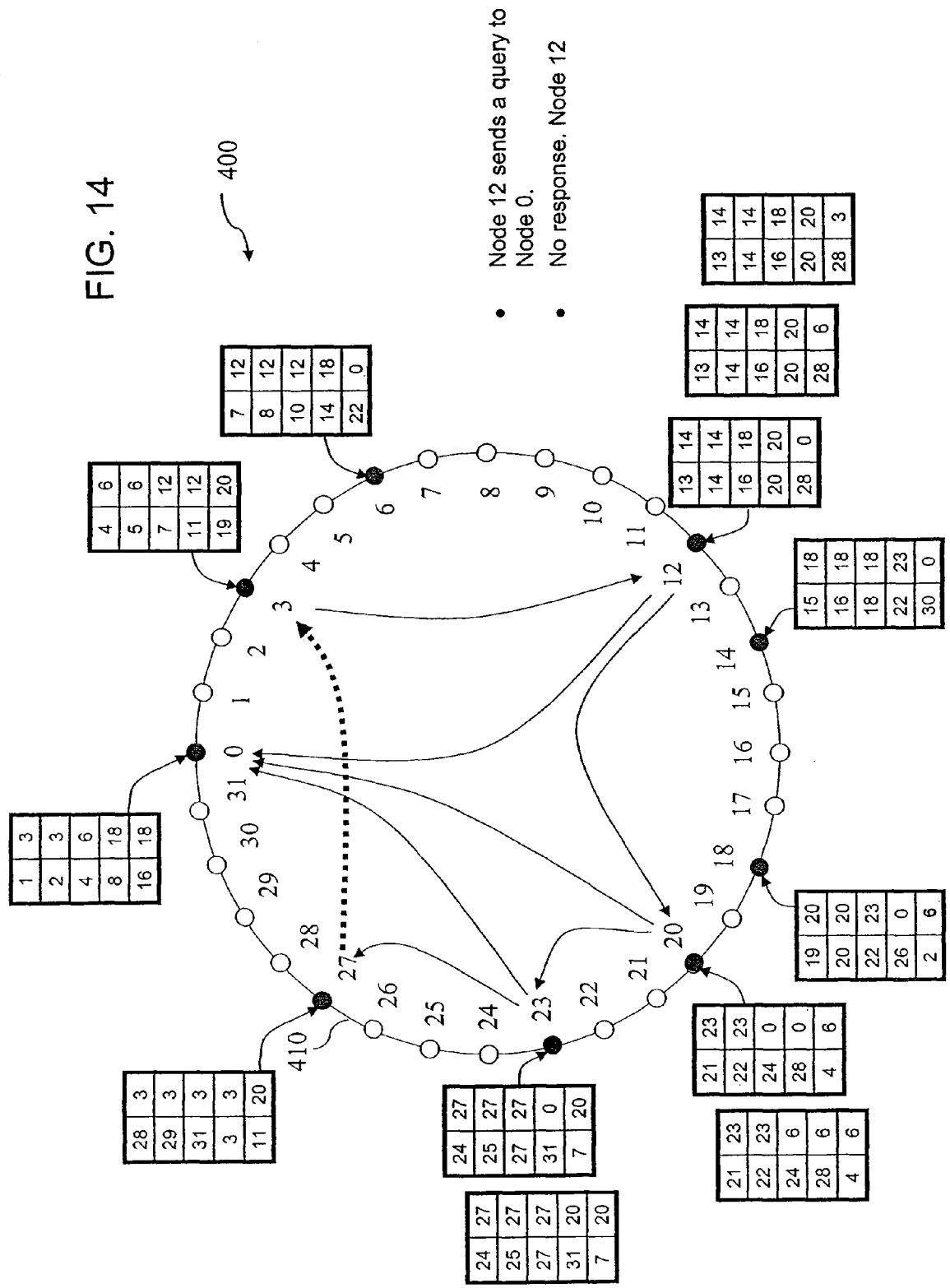

FIG. 14 is a schematic diagram of a P2P network of FIG. 11 illustrating a query method of managing communications between or among nodes of P2P network 400 in accordance with yet another exemplary embodiment of the present invention.

In the exemplary embodiment illustrated in FIG. 14, routing is based on the closest predecessor default routing scheme, however, other schemes may be possible.

Now referring to FIG. 14, when node 12 searches for resource 2, node 12 may send a query to node 0. That is, since node 12 is not responsible for resource 2 and resource 2 is not between (including end points of each interval) the resource ID and the corresponding node ID of any finger table entry (i.e., resource 2 is not between any of: (1) resource ID 13 and node ID 14 of finger table entry 440-1; (2) resource ID 14 and node ID 14 of finger table entry 440-2; (3) resource ID 16 and node ID 18 of finger table entry 440-3; (4) resource ID 20 and node ID 20 of finger table entry 440-4; and (5) resource ID 28 and node ID 0 of finger table entry 440-5, the closest node is predecessor node 0. Accordingly, the query may be sent to node 0. Node 0 is, however, inactive (not joined to P2P network 400) and has either informed at least its predecessor and possibly its successor (i.e., nodes 27 and 3, respectively), that it left P2P network 400 or otherwise node 27 may have discovered that node 0 has left the network.

In certain exemplary embodiments, leave messages from a leaving node or other indications of inactive (i.e., a node not responding to a handshake message or inactive for longer than a predetermined period) may be detected by the successor and predecessor nodes. Once detected this information regarding the inactive node may be routed via handshake messages between adjacent nodes. This dissemination of this information regarding the inactive node is a part of a handshake process and the spread of the information may be limited by a TTL value assigned to the handshake message. This information regarding the inactive node, for example, may be updated from the inactive node to each of a series of predecessor nodes until the TTL value is decremented to zero. That is, the TTL value may be decremented each time the handshake message is routed to another predecessor node until the TTL value reaches zero. In certain exemplary embodiments, this information also may be updated in certain other finger tables, for example, those tables that refer directly to (are neighboring nodes with) the inactive node. The handshake process is described in more detail below.

After the time out period, node 12 may update its finger table entry 440-5 from (28:0) to (28:6) based on its predecessor node 6 and may send the query to the next closest predecessor node stored in its finger table (i.e., node 20) based on finger table entry 440-4 of node 12.

Node 20 may forward the query to node 0 which is the closest predecessor node to resource 2 stored in finger table 340 of node 20. This is because, similar to the routing at node 12, resource 2 is not between (including the endpoints) the resource ID and the corresponding node ID of any finger table entry of node 20. Node 0 is offline (inactive), however, and, thus, node 20 waits for another timeout period, and then may update its finger table entries 440-3 and 440-4 from (24:0) and (28:0) to (24:6) and (28:6), respectively and may send the query to the next closest predecessor node stored in its finger table (i.e., node 23) based on finger table entry 440-3 of node 20.

Node 23 may forward the query to node 0 which is the closest predecessor node to resource 2. This is because, similar to the routing at nodes 12 and 20, resource 2 is not between (including the endpoints) the resource ID and the corresponding node ID of any finger table entry of node 23. Because node 0 is offline (inactive), node 23 waits for a third timeout period, and then may update its finger table entries 440-4 from (31:0) to (31:20) and may send the query to the next closest predecessor node store in its finger table (i.e., node 27) based on finger table entry 440-3.

Node 27 may forward the query to node 3 which is the closest successor node to resource 2 based on resource 2 being between (including the endpoints) the resource ID 28 and the corresponding node ID 3 of finger table entry 440-1 of recipient node 27.

After reception by node 3 of the forwarded query from node 27, node 3 may determine that it is responsible for resource 2 and may respond to the query directly to node 12. The reply message (not shown) may be either a query failure message, if resource 2 does not exist on P2P network 400 or, otherwise, the information resulting from the query request. Node 12 may update its finger table entry 340-5 from (28:6) to (28:3) based on the reply message from node 3.

As is apparent to one skilled in the art, because finger table entries are not always updated, they may be erroneous, incorrect or stale. In certain exemplary embodiments queries may be managed by limiting searches of successor nodes to cases in which the resource ID of the resource that is being located is known to be the responsibility of a particular node (i.e., between intervals, inclusive of endpoints of the intervals, of a particular finger table entry). In other exemplary embodiments, however, if a closest successor node is included in a finger table as an entry, that closest successor node may be used to forward the query, regardless of whether that node is "known" to be responsible for the resource.

Figure 15:
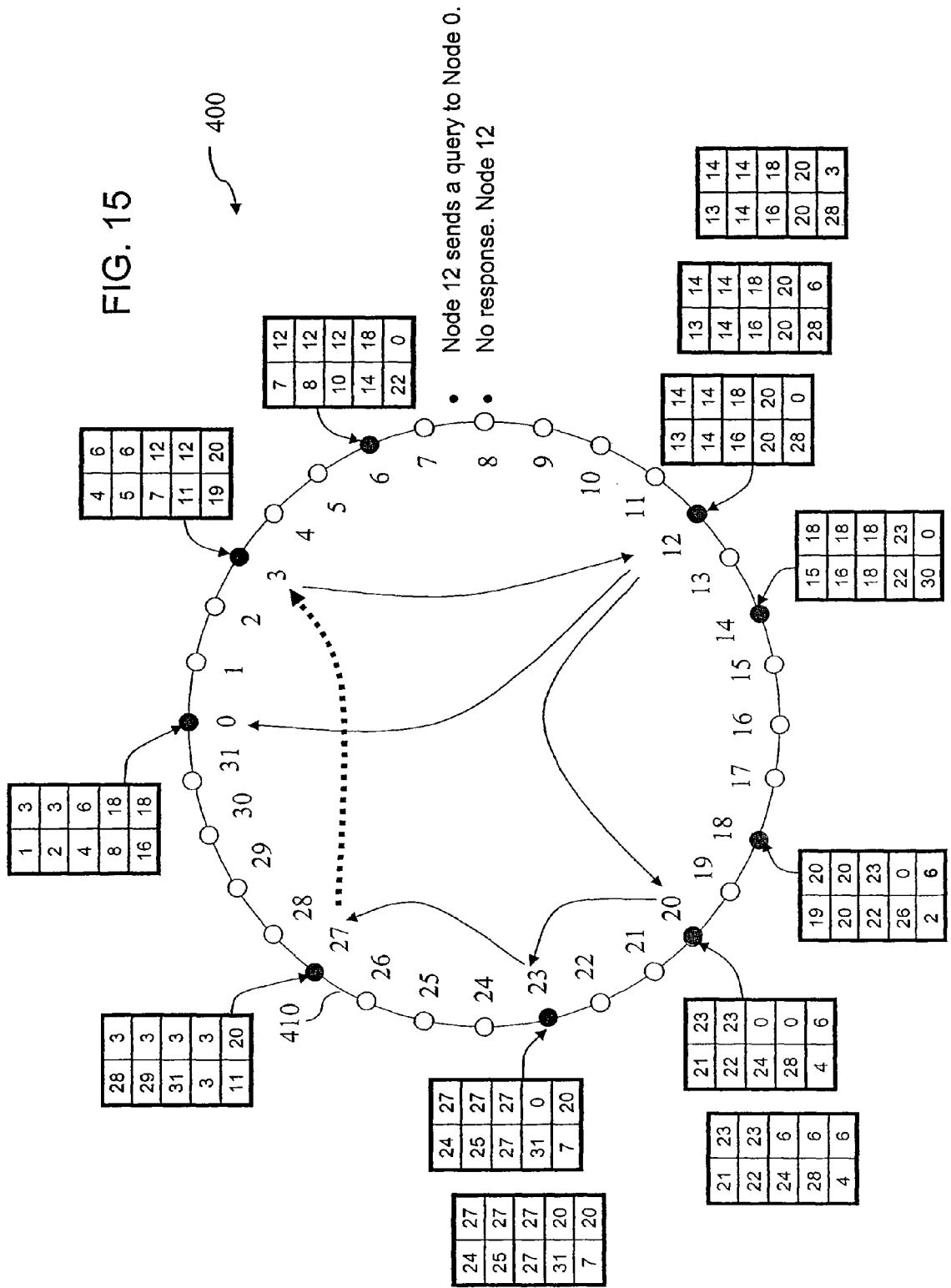

FIG. 15 is a schematic diagram of the P2P network 400 illustrating a query method of managing communications between or among nodes of P2P network 400 in accordance with yet another exemplary embodiment of the present invention.

The method illustrated in FIG. 15 is similar to that of FIG. 14 with the exception that information regarding the inactive status of node 0 is added to a tracking history of the query after discovery by node 12 such that nodes 20, 23 and 27 do not send any queries to node 0 and subsequently wait for replies, thereby, significantly reducing the amount of time waiting for these replies.

Now referring to FIG. 15, when node 12 searches for resource 2, node 12 may send a query to node 0. That is, since node 12 is not responsible for resource 2 and resource 2 is not between (including endpoints) the resource ID and the corresponding node ID of any finger table entries, the closest node is predecessor node 0.

Because node 0 is inactive, node 12 waits for a timeout period, then may add to the tracking history of the query information regarding the inactive status of node 0 and may update its finger table, appropriately. Node 12 forwards the query to node 20.

After receiving the query from node 12, node 20 may compare the information in the tracking history of the query regarding inactive nodes against the closest predecessor node (i.e., node 0) to resource 2 stored in finger table 340 of node 20 and finds that node 0 is inactive. Thus, without sending a query to node 0, node 20 may update it finger table, appropriately, and may select another node that is active (i.e., that is not indicated in the query to be inactive) from its finger table as the node to which the query is forwarded. It is desirable that the other node be the next closest processor node (i.e., node 23), however, other selections are possible.

Node 23, similarly to node 20, may update it finger table, appropriately, and may then forward the query to node 27, without sending the query to node 0, based on the information in the query indicating the inactive status of node 0.

Node 27 may forward the query to node 3 which is the closest successor node to resource 2. This is because, resource 2 is between (including the endpoints) the resource ID and the corresponding node ID of finger table entry 440-1 of node 27.

After reception by node 3 of the forwarded query from node 27, node 3 may determine that it is responsible for resource 2 and may respond to the query directly to node 12. The reply message may be either a query failure message, if resource 2 does not exist on P2P network 400 or, otherwise, the information resulting from the query request. Node 12 may update its finger table entry 340-5 from (28:6) to (28:3) based on the reply message from node 3.

In certain exemplary embodiments, each lookup or placement message may be monitored by nodes on P2P network 300 or 400 to collect information about other nodes in network 300 or 400. For example, the monitoring may include that a source node of the message is online and the previous hop of the message is online.

In certain exemplary embodiments, adjacent nodes (e.g., predecessor and/or successor nodes) may be monitored. That is, each node may attempt to maintain correct predecessor and successor information. Thus, any message exchanged with the predecessor and/or the successor serves as an aliveness check. For example, handshake messages may be exchanged between adjacent nodes (in the ID space) and each handshake message may include: (1) a predecessor of the sender of the handshake message; (2) a list of successors of the sender; (3) a list of the nodes in the finger table of the sender; (4) a list of other nodes detected by the sender; (5) a list of nodes detected as moving offline recently; and (6) a Time-to-Live (TTL) value. The handshake message may be cascaded (sent), for example, to a predecessor node if the predecessor's finger table contains the offline node or if the TTL value is larger than 0, thus, allowing predecessor nodes in a vicinity to be updated based on the information in the handshake message. The recipient node may revise its finger table based on any handshake messages received.

A minimum contact period may be set for exchange of any type of message with an adjacent node (i.e., a predecessor node or a successor node). If contact is not made within the minimum contact period, the adjacent node may consider its predecessor node or its successor node, from which it has not received any messages within the minimum contact period, to be offline. Further, a minimum neighbor update period may be set for sending handshake information to adjacent nodes.

Figure 16:
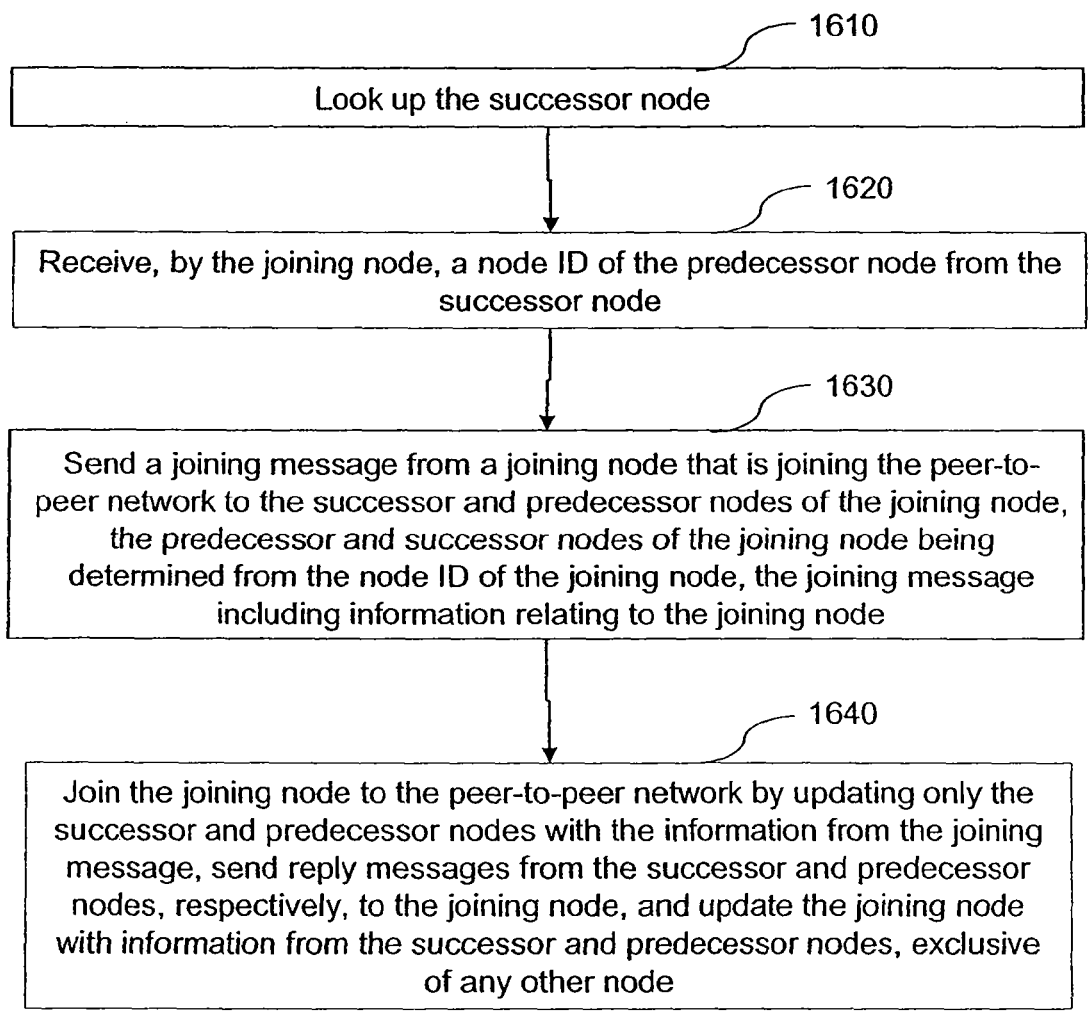
Figure 17:
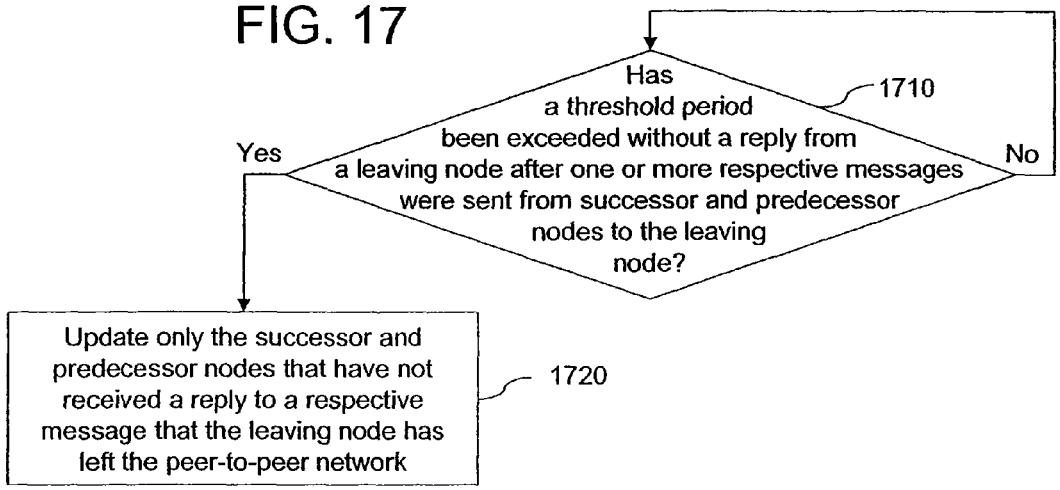
Figure 18:
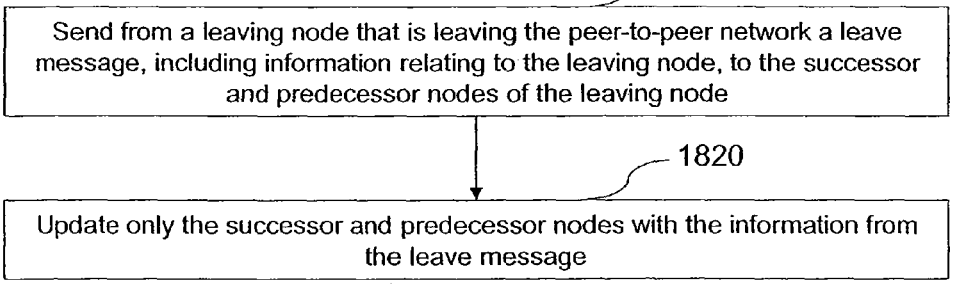
Figure 19:
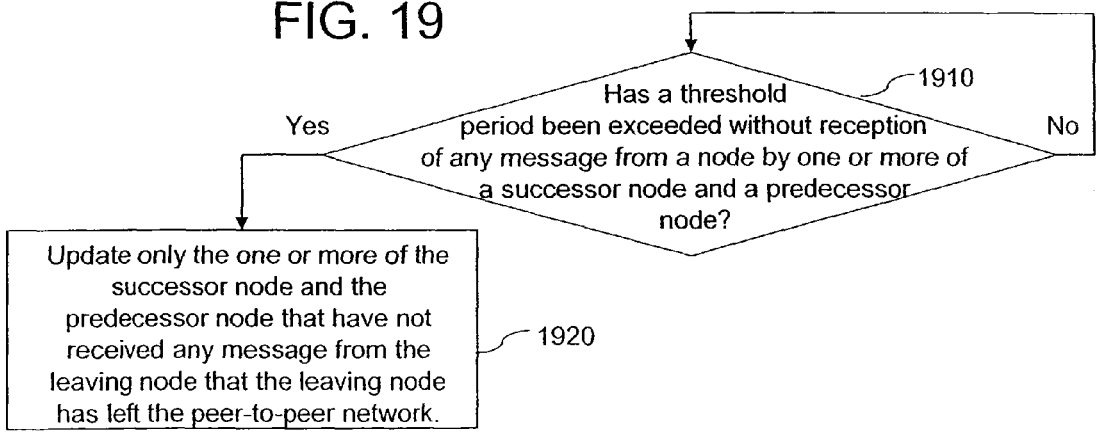
Figure 20:
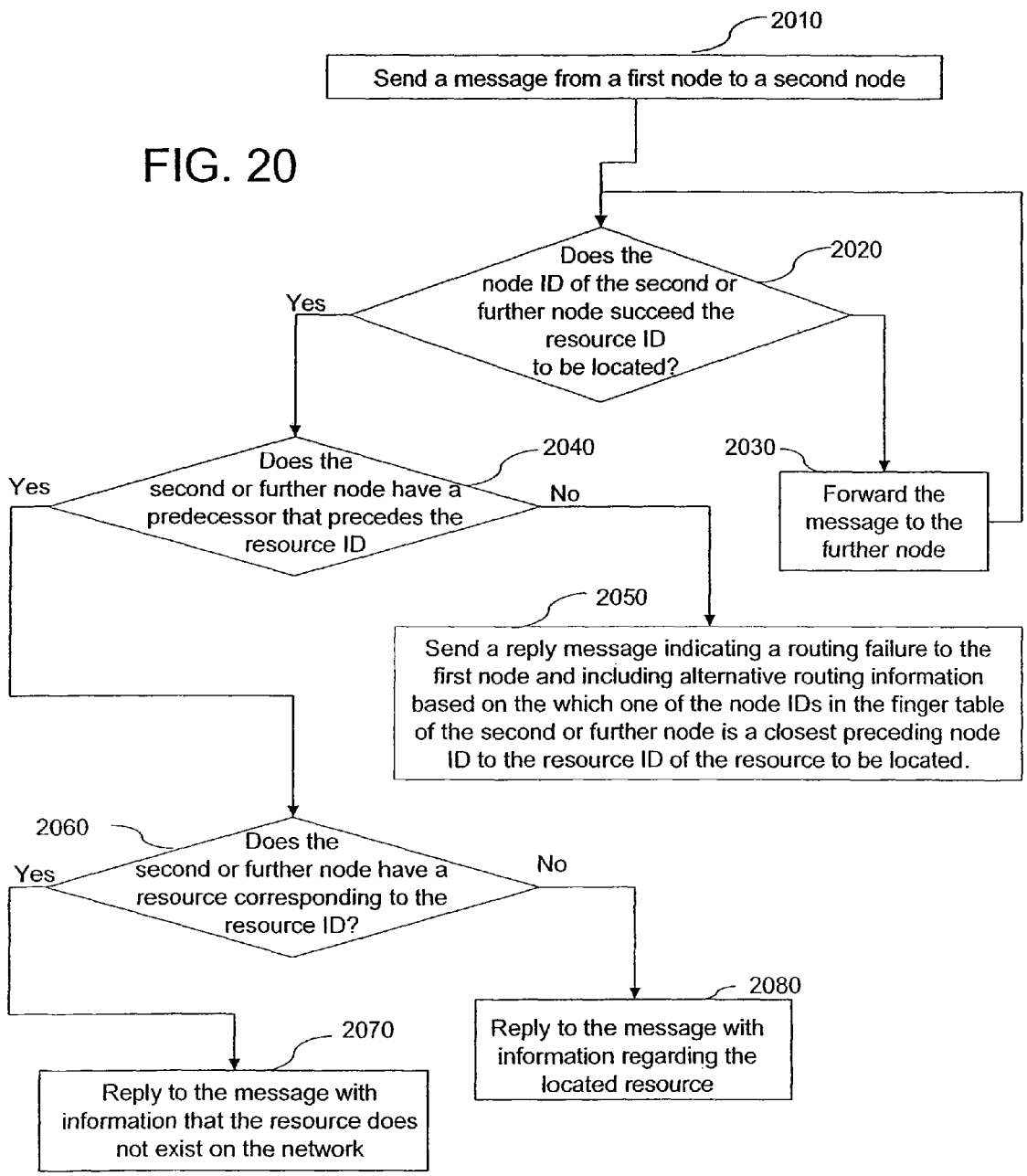

FIGS. 16, 17, 18, 19, 20, 21 and 22 are flow charts illustrating methods of managing communications between or among nodes of a P2P network in accordance with various exemplary embodiments of the present invention in which: (1) FIG. 16 illustrates a joining method to join a node to the P2P network; (2) FIGS. 17-19 illustrate leaving methods for a node to leave the P2P network; and (3) FIGS. 20-22 illustrate query methods for querying resources on the P2P network.

Now referring to FIG. 16, at block 1610, the process may look-up a successor to the joining node. That is, a lookup message may be sent from the joining node to its successor via any number of intermediate nodes including (for example a boot strap node).

At block 1620, at least a node ID of the predecessor node is received by the joining node from the successor node. In certain embodiments, the successor may provide additional information to the joining node, for example, some or all of the information included in a handshake message (e.g., its list of successors, some or all of the information in its finger tables, (2) a list of nodes in its finger table; (3) a list of other nodes it has detected; (4) a list of nodes its has detected as moving offline (being inactive) recently; and/or (5) a TTL value, among others).

At block 1630, a joining message may be sent from the joining node to its successor and predecessor nodes. The predecessor and successor nodes may be determined based on, for example, the IP address of the network resource that is joining P2P network 300 or 400 (also referred to as the joining node). The joining message may include information relating to the joining node, for example, its node ID, and other characteristics of the joining node (e.g., whether it is a mobile or fixed device) among others.

At block 1640, the joining node may join to P2P network 300 or 400. The joining operation may include updating the successor and predecessor nodes of the joining node with the information from the joining message, sending reply messages from the successor and predecessor nodes, respectively, to the joining node, and updating the joining node with information from the successor and predecessor nodes, exclusive of any other node. That is, nodes, other than the predecessor and successor nodes of P2P network 300 or 400, are not updated by the joining operation and, otherwise are only updated thereafter either by a query operation on an as-needed basis when incorrect, erroneous or stale information is discovered during a query or by the handshake process (i.e., which provides limited updates to predecessor nodes based on, for example, TTL values in the handshake messages). By only updating during the joining operation the predecessor and successor nodes, a significant reduction in overhead communications may be realized.

Now referring to FIG. 17, at block 1710, one or more respective messages are sent from the successor and/or predecessor nodes of a respective node which is leaving to the node (i.e., the leaving node). The successor node may determine whether a threshold period has been exceeded without a reply from the leaving node. Moreover, the predecessor node may also determine whether a threshold period has been exceeded without a reply from the leaving node. That is, if a reply to the message sent by the successor node or the predecessor node is not received during the threshold period, the particular node presumes that the leaving node has left P2P network 300 or 400 (i.e., that it is inactive).

At block 1720, the successor node and/or predecessor node that have not received any reply to their respective messages may be updated to indicate that the leaving node has left P2P network 300 or 400.

In particular, responsive to a lack of a reply to a first message sent from its predecessor node to the leaving node, only the predecessor node is updated and responsive to a lack of a reply to a second message sent from its successor node to it, only the successor node is updated.

Nodes, other than the predecessor and successor nodes of P2P network 300 or 400, are not updated by the leaving operation and, otherwise, are only updated thereafter either by a query operation on an as-needed basis or by the handshake process which provides only certain nodes with updated information.

Now referring to FIG. 18, at block 1810, a node that is leaving P2P network 300 or 400 may send a leave message to its successor and predecessor nodes. The leaving message may include information relating to the leaving node such as some of all of the information in a handshake message described above.

At block 1820, only the successor and predecessor nodes may be updated with the information from the leave message. That is, nodes, other than the predecessor and successor nodes of P2P network 300 or 400, are not updated by the leaving operation and, otherwise, are only updated thereafter either by a query operation on an as-needed basis when incorrect, erroneous or stale information is discovered or by the handshake process which provides only certain nodes with updated information.

Now referring to FIG. 19, at block 1910, the successor and predecessor nodes of a node may each determine whether a threshold period has been exceeded without any message from the node. That is, if no messages are received from the node by the successor node or the predecessor node, respectively, during the threshold period, the respective successor or predecessor node that did not receive any messages presumes that the node has left P2P network 300 or 400.

At block 1920, the successor node and/or predecessor node that have not received any message from the leaving node may be updated to indicate that the node has left P2P network 300 or 400. Similarly to the methods illustrated in FIGS. 17 and 18, no other nodes, other than the predecessor and successor nodes of P2P network 300 or 400, are updated by the leaving operation.

In particular, responsive to a lack of reception of any message from the a node by one or more of the successor node or the predecessor node for more than a threshold period, only the one or more of the successor node and the predecessor node that have not received any message from the leaving node is updated.

Now referring to FIG. 20, at block 2010, a message may be sent from a first node to a second node. The selection of the second node as the recipient of the message may be based on which one of the node IDs in the finger table of the first node is a closest node ID to a resource ID of a resource to be located.

The closest node may refer to either the closest predecessor node or the closest successor node depending on whether the resource ID of the resource to be located matches an interval associated with a finger table entry. That is, when the resource ID of the resource to be located is between (i.e., inclusive of the endpoints of the interval) a resource ID and a corresponding node ID of a respective finger table entry, the closest node ID may be defined as the corresponding node ID stored in the finger table and when the resource ID of the resource to be located is not between the resource ID and the corresponding node ID of any finger table entry, the closest node may be defined as the closest predecessor node in the respective finger table.

Although a closest node desirably may be defined as set forth above, other definitions are also possible, for example, closest node may refer to the closest successor node based on the finger table entries of the respective finger table.

At block 2020, the second node or a further node may determine whether the node ID thereof succeeds the resource ID of the resource to be located. At block 2030, if the node ID does not succeed the resource ID of the resource to be located, the message is forwarded to the further node. At block 2040, if the node ID succeeds this resource ID, the second or further node may determine whether a predecessor thereof precedes the resource ID of the resource to be located.

At block 2050, if the predecessor of the second node does not precede the resource ID of the resource to be located, the second or further node may send a reply message indicating a routing failure to the first node and including alternative routing information based on the which one of the node IDs in the finger table of the second or further node is a closest preceding node ID to the resource ID of the resource to be located.

At block 2060, if the predecessor of the second node or further node precedes the resource ID of the resource to be located, the second or further node may determine whether it has a resource corresponding to the resource ID of the resource to be located by performing a lookup based on the resource ID.

At block 2070, if the second or further node does not have the resource (i.e., the lookup process failed), the second or further node may reply to the message with information that the resource does not exist on P2P network 300 or 400.

At block 2080 if the second node or the further node has the resource, a reply message may be sent to the first node including information regarding the located resource.

Now referring to FIG. 21, at block 2110, a message may be sent from a first node to a second node. The selection of the second node as the recipient of the message may be based on which one of the node IDs in the finger table of the first node is a closest node ID to a resource ID of a resource to be located. At block 2120, the sent message may include information indicating the node or nodes used to locate the resource, as a tracking history of the message. That is, as the message is routed from node-to-node, information may be added to the message to indicate the routing path the message has taken. With such information, routing loops may be detected and the message may be rerouted responsive to the detected routing loop errors.

At block 2130, the respective second node or further node may determine whether the node ID thereof succeeds the resource ID of the resource to be located. If not, at block 2140, the second node or further node may determine whether the closest node ID in the respective finger table of the second or further node matches any node ID in the tracking history of the message. At block 2150, if the closest node ID in the respective finger table of the second or further node matches any node ID in the tracking history of the message, the message may be routed to another node in the finger table of the respective second or further node that does not match to any node that is in the tracking history of the message. For example, it may be desirable to route the message to the next closest node that does not match to any node in the tracking history. At block 2160, if the closest node ID in the respective finger table of the second or further node does not match a node ID in the tracking history of the message, the message may be forwarded to the closest node stored in the finger table of respective second or further node. Moreover processing after block 2150 or 2160 may be transferred to block 2130.

At block 2170, if the node ID succeeds the resource ID, the second or further node may determine whether its predecessor precedes the resource ID of the resource to be located (i.e., whether the resource ID of the resource that is being located is between an interval (inclusive of the endpoints of the interval) corresponding to the resource ID in resource ID field 350 or 450 of the first finger table entry (i.e., 340-1 or 440-1) and the node ID of node ID field 360 or 460 of the last finger table entry (in this case 340-5 or 440-5). At block 2175, if the predecessor of the second or further node does not precede the resource ID of the resource to be located, the second or further node may send a reply message indicating a routing failure to the first node and including alternative routing information based on the which one of the node IDs in the finger table of the second or further node is a closest preceding node ID to the resource ID of the resource to be located that also does not match to any node that is in the tracking history of the message.

At block 2180, if the predecessor of the second node or further node precedes the resource ID of the resource to be located, the second or further node may determine whether it has a resource corresponding to the resource to be located by performing a lookup based on the resource ID of the resource to be located.

At block 2185, if the second or further node does not have the resource (i.e., the lookup process failed), the second or further node may reply to the message with information that the resource does not exist on P2P network 300 or 400.

At block 2190 if the second node or the further node has the resource, a reply message may be sent to the first node including information regarding the located resource.

Now referring to FIG. 22, at block 2210, a message may be sent from a previous node to a subsequent node based on the node ID in the finger table of the previous node. That is, a message may be forwarded one or more times, and in such a sequence two such nodes may represent a previous node and a subsequent node. These nodes may be sequentially one after the other. At block 2220, the previous node may determine whether the subsequent node is active (i.e., online). That is, the previous node may send the message to the subsequent node and wait for a reply. If the time for a reply exceeds a threshold period, the previous node presumes that the subsequent node is inactive. As the message is routed from node-to-node, information may be added to the message to indicate nodes which do not reply and, thus, are presumed to be inactive (i.e., have an inactive status). With such information, finger tables of nodes in the routing path may be updated to reduce query time by substantially eliminating repeated time-outs due to inactive or offline nodes.

At block 2230, the message may be resent from the previous node to an alternate node that is active based on a different node ID in the finger table of the previous node. That is, selection of the alternate node may be based, at least partially, on whether the alternate node is indicated in the message to be inactive by comparing the node ID of the alternate node with the inactive status information in the message.

At block 2240, the message may be sent from the subsequent node (if active; see block 2220) or the alternative node (if the subsequent node is inactive; see block 2230) to a further node that does not match any node ID indicated in the message to be inactive. Although not shown this further node may be treated the same as a new subsequent node and the process may be repeated at each node until the node responsible for the resource is located.

It is contemplated that according to exemplary embodiments, finger tables may be allow to include non-fatal errors (i.e., errors in finger table entries relating to non-adjacent nodes) as a way of significantly reducing overhead communications. Error detection and correction techniques may be used to route queries when an error is detected and to update incorrect, erroneous or stale finger table entries after detection of such errors. Moreover, certain information may be added to the queries (e.g., information relating to the routing path history and the status of the nodes traversed) as they are forwarded to improve error detection and, thus, improve the efficiency of the P2P network.

Although the invention has been described in terms of a P2P network and a method of managing such a network, it is contemplated that it may be implemented in software on microprocessors/general purpose computers (not shown). In various embodiments, one or more of the functions of the various components may be implemented in software that controls a general purpose computer. This software may be embodied in a computer readable carrier, for example, a magnetic or optical disk, a memory-card or an audio frequency, radio-frequency, or optical carrier wave.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for managing a peer-to-peer network that includes a plurality of at least four nodes, each node having a node ID, each respective node of the peer-to-peer network being associated with a different network device, the method comprising the steps of:

a) sending, from a leaving node that is leaving the peer-to-peer network, a leave message, including information relating to the leaving node, to a successor node and a predecessor node of the leaving node, as two neighboring nodes of the leaving node, the two neighboring nodes being nodes known to the leaving node;

b) updating the two neighboring nodes exclusive of any other node of the plurality of at least four nodes with the information from the leave message;

c) routing a message from a source node to a destination node using respective ones of the plurality of at least four nodes including the leaving node based on a first routing scheme; and d) (1) routing of a message from the predecessor node to a further predecessor node, the routed message including a time-to-live (TTL) value (2) decrementing the TTL value; (3) if the decremented TTL value is greater than zero, routing the message to another further predecessor node; and (4) repeating steps (2) and (3) until the TTL value is zero.

2. The method of claim 1 wherein the peer-to-peer network is a Chord network.

3. A non-transitory computer readable storage medium storing software that is configured to control a general purpose computer to control communication from a device in the communication system by implementing a method according to claim 1.

4. A method for managing a peer-to-peer network that includes a plurality of at least four nodes, each node having a node ID, each respective node of the peer-to-peer network being associated with a different network device, the method comprising the steps of:

a) responsive to a lack of a reply to at least one message sent from one of a successor node or a predecessor node of a leaving node, to the leaving node, updating the successor and predecessor nodes, as two neighboring nodes, exclusive of other nodes of the plurality of at least four nodes, that the leaving node has left the peer-to-peer network;

b) routing a message from a source node to a destination node using respective ones of the plurality of at least four nodes including the leaving node based on a first routing scheme; and c) (1) routing a message from the predecessor node to a further predecessor node, the routed message including a time-to-live (TTL) value; (2) decrementing the TTL value; (3) if the decremented TTL value is greater than zero, routing the message to another further predecessor node; and (4) repeating steps (2) and (3) until the TTL value is zero.

5. The method of claim 4, wherein the peer-to-peer network is a Chord network.

6. A method for managing a peer-to-peer network that includes a plurality of at least four nodes, each node having a node ID, each respective node of the peer-to-peer network being associated with a different network device, the method comprising the steps of:

a) responsive to non-reception of any message from a leaving node by a successor node or a predecessor node for more than a threshold period, updating the successor node and the predecessor node, as two neighboring nodes, exclusive of other nodes of the plurality of at least four nodes, that the leaving node has left the peer-to-peer network;

b) routing a message from a source node to a destination node using respective ones of the plurality of at least four nodes including the leaving node based on a first routing scheme;

c) (1) routing of the message from the predecessor node to a further predecessor node, the routed message including a time-to-live (TTL) value; (2) decrementing the TTL value; (3) if the decremented TTL value is greater than zero, routing the message to another further predecessor node; and (4) repeating steps (2) and (3) until the TTL value is zero.

7. The method of claim 6, wherein the peer-to-peer network is a Chord network.

* * * * *